(12) United States Patent  (10) Patent No.: US 6,224,835 B1
Langer  (45) Date of Patent: May 1, 2001

(54) MULTILAYER INTUMESCENT SHEET

(75) Inventor: Roger L. Langer, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/990,961

(22) Filed: Dec. 15, 1997

Related U.S. Application Data

(63) Continuation-in-part of application No. 08/796,827, filed on Feb. 6, 1997, now Pat. No. 6,051,193.

(51) Int. Cl.⁷ ............................. F01N 3/28; B01D 53/94; B32B 5/00
(52) U.S. Cl. ........................ 422/179; 422/180; 422/221; 428/57; 428/920
(58) Field of Search .................... 422/179, 180, 422/221, 222; 428/920, 921, 57, 77, 324, 327

(56) References Cited

U.S. PATENT DOCUMENTS

| | | | |
|---|---|---|---|
| 3,916,057 | 10/1975 | Hatch et al. | 428/236 |
| 4,048,363 | 9/1977 | Langer et al. | 428/77 |
| 4,271,228 | 6/1981 | Foster et al. | 428/281 |
| 4,285,909 | 8/1981 | Shinichiro et al. | 422/179 |
| 4,305,992 | 12/1981 | Langer et al. | 428/324 |
| 4,454,190 | 6/1984 | Katagiri | 428/281 |

(List continued on next page.)

FOREIGN PATENT DOCUMENTS

| | | |
|---|---|---|
| 0 319 299 | 6/1989 | (EP) . |
| 0 396 330 | 11/1990 | (EP) . |
| 0 429 246 | 5/1991 | (EP) . |
| 0 602 018 | 6/1994 | (EP) . |
| 0 639 702 | 2/1995 | (EP) . |
| WO 97/02218 | 1/1997 | (WO) . |
| WO 97/02219 | 1/1997 | (WO) . |
| WO 97/02412 | 1/1997 | (WO) . |
| WO 97/02413 | 1/1997 | (WO) . |
| WO 97/02414 | 1/1997 | (WO) . |

OTHER PUBLICATIONS

Tappi Journal, "Multi–ply Sheet Formation On Inclined–Wire Formers," Oct., 1988, pp. 155–158.
Patent Abstracts of Japan, vol. 008, No. 083 (M–290), Apr. 17, 1984 & JP 59 000519 A, (Nippon Asbestos KK) Jan. 5, 1984 (abstract).
Umehara et al.: "Design Development of High Temperature Manifold Converter Using Thin Wall Ceramic Substrate", *Society of Automotive Engineers*, No. SAE971030, 1997, pp. 123–129.
Japanese Patent Application (translation) Publication No. J.P. Hei.2–43786.

*Primary Examiner*—Hien Tran
(74) *Attorney, Agent, or Firm*—Harold C. Knecht, III

(57) ABSTRACT

A multilayer intumescent mat or sheet is useful for mounting a pollution control device or as a firestop. In one aspect, the multilayer intumescent sheet of the invention comprises a non-moldable flexible non-intumescent layer and a non-moldable flexible intumescent layer comprising an intumescent material wherein the layers form a single sheet without the use of auxiliary bonding means. The mat desirably includes a significant proportion of inorganic fiber containing shot, and small proportions of shot-free inorganic fiber and intumescent material. In another aspect, the multilayer intumescent sheet of the invention comprises a first non-moldable intumescent layer comprising a first intumescent material and a second non-moldable intumescent layer comprising a second intumescent material, the first and second intumescent materials being different, wherein the layers form a single sheet without the use of auxiliary bonding means. The invention also provides a pollution control device comprising a multilayer sheet of the invention disposed between a monolith and a housing.

15 Claims, 11 Drawing Sheets

U.S. PATENT DOCUMENTS

| | | | |
|---|---|---|---|
| 4,495,030 | 1/1985 | Giglia | 162/145 |
| 4,499,134 | 2/1985 | Whitely et al. | 428/102 |
| 4,504,527 | 3/1985 | Hara et al. | 427/318 |
| 4,600,634 | 7/1986 | Langer | 428/220 |
| 4,612,087 | 9/1986 | Ten Eyck | 162/129 |
| 4,750,251 | 6/1988 | Motley et al. | 29/157 R |
| 4,782,661 | 11/1988 | Motley et al. | 60/299 |
| 4,863,700 | 9/1989 | Ten Eyck | 422/179 |
| 4,865,818 | 9/1989 | Merry et al. | 422/179 |
| 4,879,170 | 11/1989 | Radwanski et al. | 428/233 |
| 4,929,429 | 5/1990 | Merry | 422/179 |
| 4,999,168 | 3/1991 | Ten Eyck | 422/179 |
| 5,032,441 | 7/1991 | Ten Eyck et al. | 428/77 |
| 5,094,780 | 3/1992 | von Bonin | 252/606 |
| 5,132,054 | 7/1992 | Stahl | 252/606 |
| 5,137,658 | 8/1992 | Stahl | 252/606 |
| 5,139,615 | 8/1992 | Conner et al. | 162/145 |
| 5,246,759 | 9/1993 | Keller | 428/74 |
| 5,254,410 | 10/1993 | Langer et al. | 428/402 |
| 5,258,216 | 11/1993 | von Bonin et al. | 428/102 |
| 5,332,609 | 7/1994 | Corn | 428/77 |
| 5,376,341 | 12/1994 | Gulati | 422/179 |
| 5,384,188 | 1/1995 | Lebold et al. | 428/283 |
| 5,385,873 | 1/1995 | MacNeill | 501/95 |
| 5,452,551 | 9/1995 | Charland et al. | 52/232 |
| 5,468,348 | 11/1995 | Blackledge et al. | 162/132 |
| 5,482,686 | 1/1996 | Lebold et al. | 422/179 |
| 5,523,059 | 6/1996 | Langer | 422/179 |
| 5,580,532 | 12/1996 | Robinson et al. | 422/179 |
| 5,615,711 | 4/1997 | Lewis | 138/149 |

MULTILAYER INTUMESCENT SHEET

CROSS-REFERENCE TO RELATED APPLICATION(S)

This is a continuation in part of application Ser. No. 08/796,827, filed Feb. 6, 1997, now U.S. Pat. No. 6,051,193, and entitled "MULTILAYER INTUMESCENT SHEET".

FIELD OF THE INVENTION

This invention relates to flexible intumescent sheets useful as firestops or as mounting mats for catalytic converters and diesel particulate filters or traps and particularly to such devices containing flexible multilayer intumescent sheets that have at least two layers with differing intumescent properties.

BACKGROUND OF THE INVENTION

Pollution control devices are employed on motor vehicles to control atmospheric pollution. Such devices include catalytic converters and diesel particulate filters or traps. Catalytic converters typically contain a ceramic monolithic structure which supports the catalyst. The monolithic structure may also be made of metal. Diesel particulate filters or traps are wall flow filters which have honeycombed monolithic structures typically made from porous crystalline ceramic materials.

Each of these devices has a metal housing (typically stainless steel) which holds a monolithic structure made of ceramic or metal such as steel. The monolithic structures have walls with a catalyst thereon. The catalyst oxidizes carbon monoxide and hydrocarbons, and reduces the oxides of nitrogen in engine exhaust gases to control atmospheric pollution.

Ceramic monoliths are often described by their wall thickness and the number of openings or cells per square inch (cpsi). In the early 1970s, monoliths with a wall thickness of 12 mils and a cell density of 300 cpsi were common ("12/300 monoliths"). As emission laws become more stringent, wall thicknesses have decreased as a way of increasing geometric surface area, decreasing heat capacity and decreasing pressure drop of the monolith. The standard has progressed to 6/400 monoliths.

With their thin walls, ceramic monolithic structures are fragile and susceptible to vibration or shock damage and breakage. The damaging forces may come from rough handling or dropping during engine assembly, from engine vibration or from travel over rough roads. The monoliths are also subject to damage due to high thermal shock, such as from contact with road spray.

The ceramic monoliths have a coefficient of thermal expansion generally an order of magnitude less than the metal housing which contains them. For instance, the gap between the peripheral wall of the metal housing and the monolith may start at about 4 mm, and may increase a total of about 0.33 mm as the engine heats the catalytic converter monolithic element from 25° C. to a maximum operating temperature of about 900° C. At the same time, the metallic housing increases from a temperature of about 25° C. to about 530° C. Even though the metallic housing undergoes a smaller temperature change, the higher coefficiential thermal expansion of the metallic housing causes the housing to expand to a larger peripheral size faster than the expansion of the monolithic element. Such thermal cycling typically occurs hundreds or thousands of times during the life of the vehicle.

To avoid damage to the ceramic monoliths from road shock and vibrations, to compensate for the thermal expansion difference, and to prevent exhaust gases from passing between the monoliths and the metal housings (thereby bypassing the catalyst), mounting mats or mounting paste materials are disposed between the ceramic monoliths and the metal housings. The process of placing the monolith within the housing is also called canning and includes such steps as wrapping a sheet of mat material around the monolith, inserting the wrapped monolith into the housing, pressing the housing closed, and welding flanges along the lateral edges of the housing. The paste may be injected into the gap between the monolith and the metal housing, perhaps as a step in the canning process.

Typically, the paste or sheet mounting materials include inorganic binders, inorganic fibers, intumescent materials, organic binders, fillers and other adjuvants. The materials may be used as sheets, mats, or pastes. Known mat materials, pastes, and intumescent sheet materials used for mounting a monolith in a housing are described in, for example, U.S. Pat. No. 3,916,057 (Hatch et al.), U.S. Pat. No. 4,305,992 (Langer et al.), U.S. Pat. No. 4,385,135 (Langer et al.), U.S. Pat. No. 5,254,410 (Langer et al.), U.S. Pat. No. 5,242,871 (Hashimoto et al.), U.S. Pat. No. 3,001,571 (Hatch), U.S. Pat. No. 5,385,873 (MacNeil), U.S. Pat. No. 5,207,989 (MacNeil), and GB 1,522,646 (Wood). With any of these materials, the mounting material should remain very resilient at a full range of operating temperatures over a prolonged period of use.

To continually improve emission standards, it has been desired to move the catalytic converter closer to the engine and thereby increase the temperature of the exhaust gasses traveling through the catalytic converter. The hotter catalytic converter and exhaust gasses therein increase the efficiency of the reactions which remove pollution from the exhaust gasses. As hotter catalytic converter temperatures are used, the mounting materials must be able to withstand the severe temperatures. In addition, the thermal transmission properties of the mounting material become more important toward protecting closely mounted engine components from the hot exhaust temperatures. Decreasing the converter skin temperature is important in preventing heat damage in the engine compartment and radiation into the passenger compartment.

It has also been desired to continually decrease wall thicknesses of the ceramic monolithic structure to enhance the catalytic converter operation. Extremely thin wall monoliths, such as 4/400, 4/600, 4/900, 3/600, 3/900 and 2/900 monoliths, have been developed or are expected to be developed in the not too distant future. The monoliths with extremely thin walls are even more delicate and susceptible to breakage. Typical intumescent mounting structures provide compression pressures which increase during use of the catalytic converter to a pressure above the initial mounting pressure. Increasing compression pressures during use of the catalytic converter also reduce the ability of support mats or pastes to sufficiently insulate the monolith from vibration damage or mechanical shock. Because of these various problems, published reports have advised against using intumescent mounting mats for extremely thin wall monoliths mounted close to the engine. See for example Umehara et al., "Design Development of High Temperature Manifold Converter Using Thin Wall Ceramic Substrate", SAE paper no. 971030, pg. 123–129, 1997.

The exposed edges of the mounting materials are subject to erosion from the pulsating hot exhaust gases, particularly as the mounting materials are thermally cycled numerous times. Under severe conditions, over a period of time, the mounting materials can erode and portions of the materials can be blown out. In time, a sufficient amount of the mounting materials can be blown out and the mounting materials can fail to provide the needed protection to the monolith.

Solutions to the erosion problem include the use of a stainless steel wire screen (see e.g., U.S. Pat. No. 5,008,086 (Merry)) and braided or rope-like ceramic (i.e., glass, crystalline ceramic, or glass-ceramic) fiber braiding or metal wire material (see, e.g., U.S. Pat. No. 4,156,333 (Close et al.)), and edge protectants formed from compositions having glass particles (see, e.g., EP 639701 A1 (Howorth et al.), EP 639702 A1 (Howorth et al.), and EP 639700 A1 (Stroom et al.)) to protect the edge of the intumescent mat from erosion by exhaust gases. These solutions employ the use of state of the art mounting materials as the primary support for the monolith.

Known bonded multilayer mounting mats are typically made by first separately forming the layers and then bonding the layers together using an adhesive or a film or other means such as, for example, stitches or staples. Typically, adhesively or film bonded multilayer mounting mats contain higher levels of organic material which produces undesirable smoke and odor when used in a catalytic converter. To prevent such smoke and odor, the mounting mats would have to be preheated before installation to burn off the organic bonding materials. The adhesive or film bonding layer also affects the thermal properties of the mat. Additionally, such mounting mats are more expensive to manufacture due to the cost of bonding the layers together and the cost of the adhesive or film used. Some disadvantages of mechanically bonded or attached multilayered mounting mats include the expense of added steps and materials and the mat may be weakened at the point of mechanical attachment such as where stitches or staples perforate the mat. Other multilayer mounting mats are comprised of separate layers that must be individually mounted within the catalytic converter housing.

A disadvantage of a single layer mat or sheet containing expandable graphite or a mixture of expandable graphite and unexpanded vermiculite is that typically such single sheet constructions having a homogeneous or uniform composition throughout the sheet require relatively high amounts of expandable graphite for the desired low temperature expansion which increases the cost of the mat.

A need thus exists for a mounting system which is sufficiently resilient and compressible to accommodate the changing gap between the monolith and the metal housing over a wide range of operating temperatures and a large number of thermal cycles. While the state of the art mounting materials have their own utilities and advantages, there remains an ongoing need to improve mounting materials for use in pollution control devices. Additionally, one of the primary concerns in forming the mounting mat is balancing between the cost of the materials and performance attributes. It is desirable to provide such a high quality mounting system at the lowest possible cost.

SUMMARY OF THE INVENTION

The invention provides a multilayer intumescent mat or sheet that is useful as a mounting for a catalytic converter element or a diesel particulate filter or as a firestop. In one aspect, the layer adjacent the ceramic monolith contains a mixture of inexpensive shot-containing inorganic fiber material and more expensive, shot-free inorganic fiber material. The layer adjacent the metal housing contains an intumescent material. In another aspect of the invention, the layer adjacent the metal housing is thin enough and the intumescent material has a high enough intumescing temperature that the intumescent material does not begin to expand until the gap between the ceramic monolith and the metal housing begins to expand.

Some of the advantages of the present invention include, for example, that the flexible multilayer sheet: is made without adhesives or other auxiliary bonding means; can be formulated so to expand or intumesce over specific temperature ranges using relatively less intumescent material; can be made using a continuous process; is easier to handle and requires less labor to install than mats made from two or more individually bonded sheets; and requires less organic materials than adhesively bonded or laminated sheets because an adhesive is not required.

It is to be understood that both the foregoing general description and the following detailed description are exemplary and explanatory and are intended to provide further explanation of the invention as claimed. Additional features and advantages of the invention will be set forth in and will be apparent from the following description and examples.

Figure 1:
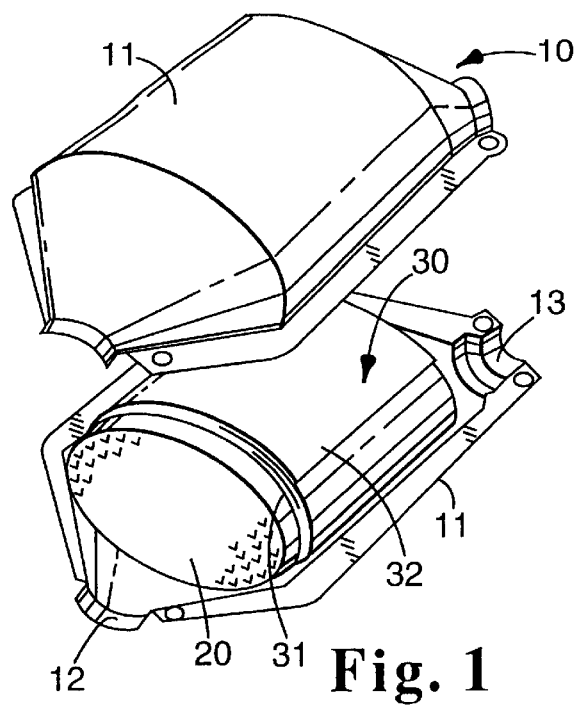
FIG. 1 is a perspective view of a catalytic converter incorporating a preferred embodiment of the present invention and shown in disassembled relation.

While the above-identified drawing figures set forth preferred or desired embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE INVENTION

In general terms, the flexible multilayer sheet of the present invention is substantially inorganic and comprises at least two non-moldable flexible layers wherein at least one of the layers comprises an intumescent material. The two layers desirably form a single resilient sheet without auxiliary bonding means, such as by conforming one layer on top of the other in a single wet laid sheet.

One of the unique features of the intumescent sheets of the present invention is that the sheets, taken as a whole and particularly in cross-section, have a non-homogeneous composition. This feature results from forming a single sheet from at least two adjacent layers wherein each adjacent layer has a homogeneous, but distinct composition. The desired sheets include a non-intumescent layer containing ceramic fibers, and an intumescent layer containing either unexpanded vermiculite, unexpanded treated vermiculite, or a mixture of both. In another preferred embodiment, a first intumescent layer contains intumescent graphite and a second intumescent layer contains either unexpanded vermiculite, unexpanded treated vermiculite, or a mixture of both. In another preferred embodiment, a first intumescent layer contains a mixture of expandable graphite and unexpanded vermiculite and a second intumescent layer contains either unexpanded vermiculite, unexpanded treated vermiculite, or a mixture of both.

In one aspect, the multilayer intumescent sheet of the invention comprises at least one non-moldable flexible non-intumescent layer and at least one non-moldable flexible intumescent layer comprising an intumescent material wherein the layers form a single sheet without the use of auxiliary bonding means. In another aspect, the multilayer intumescent sheet of the invention provides at least (a) a first non-moldable intumescent layer comprising a first intumescent material and (b) a second non-moldable intumescent layer comprising a second intumescent material, the first and second intumescent materials being different, wherein the layers form a single sheet without the use of auxiliary bonding means.

In another aspect, the invention provides a catalytic converter or a diesel particulate filter or pollution control device using a multilayer sheet of the invention. A pollution control device of the invention comprises a housing, a monolithic structure or element(s), and a multilayer intumescent sheet comprising (a) at least one non-moldable flexible non-intumescent layer; and (b) at least one non-moldable flexible intumescent layer comprising an intumescent material, said layers forming a single sheet without the use of auxiliary bonding means, said multilayer sheet being disposed between the structure and the housing to hold the structure in place. The non-intumescent layer is an inner layer positioned toward the pollution control element and intumescent layer is an outer layer positioned toward the peripheral wall of the housing.

In yet another aspect, the invention provides a pollution control device of the invention comprising a housing, a monolithic structure or element(s), and a multilayer intumescent sheet comprising at least (a) a first non-moldable flexible intumescent layer comprising a first intumescent material; and (b) a second non-moldable flexible intumescent layer comprising a second intumescent material, the first and second intumescent materials being different, said layers forming a single sheet without the use of auxiliary bonding means, said multilayer sheet being disposed between the structure and the housing to hold the structure in place.

In another aspect, the invention provides a flexible multilayer intumescent sheet useful as a firestop comprising at least (a) a non-moldable flexible non-intumescent layer comprising endothermic filler; and (b) a non-moldable flexible intumescent layer comprising an intumescent material, said layers forming a single sheet without the use of auxiliary bonding means.

In another aspect, the invention provides a process for making a multilayer intumescent sheet comprising the steps of (a) providing a first slurry and a second slurry, said first and second slurries comprising inorganic materials and at least one of the slurries contains an intumescent material; (b) depositing the first slurry onto a permeable substrate; (c) partially dewatering said first slurry to form a first layer; (d) depositing the second slurry onto said first layer; and (e) dewatering said second slurry to form a second layer, said layers forming a single sheet without auxiliary bonding means, wherein said process is a continuous process.

Generally, each of the homogeneous layers of the multilayer sheets of the invention can comprise from 0.3 to 99.7 dry weight percent of the entire multilayer sheet. Desirably, each of the layers comprise from 1.5 to 98.5 dry weight percent, more desirably, from 8 to 92 dry weight percent, and even more desirably from 15 to 85 dry weight percent of the sheet. In one embodiment, the inner layer comprises at least 50 dry weight percent of the sheet, and more desirably about 60 to 85 percent of the dry weight percent of the sheet. The dry weight percents can be calculated from the individual slurry compositions.

The sheets of the present invention are useful, for example, for mounting catalytic converters and diesel particulate filters, and as fire protection sheets or stops in buildings. Of course, the composition, thickness, and width of each of the layers may be varied to fit any contemplated end use.

Generally, the multilayer intumescent sheets of the invention have a thickness of at least 0.1 mm, desirably of at least 0.5 mm, and more desirably of at least 1 mm. Typical thicknesses of multilayer intumescent sheets of the invention for use in pollution control devices range from about 2 to about 11 mm.

Prior to being heated during use in a pollution control device, the intumescent sheets of the present invention are flexible and resilient and can be handled and flexed and wrapped around a monolith without breaking or undesirable cracking.

The multilayer sheets of the present invention also contemplate sheets comprising three or more non-moldable flexible layers which form a single sheet without auxiliary bonding means wherein at least one of the layers comprises an intumescent material.

As used herein, the phrase "without auxiliary bonding means" means without the use of bonding means such as resins, adhesives, adhesive tapes, stitches, staples, and other externally used bonding means.

As used herein, "layer" means a thickness of material having a homogeneous composition that is separately formed by first depositing and then at least partially dewatering a dilute slurry having a homogeneous composition. Each of the layers of the multilayer sheets of the invention may have the same or different widths and thicknesses.

As used herein, "non-moldable layer" means a layer that is made from compositions of materials containing 10 percent or less by weight solids that are wet laid using papermaking techniques.

As used herein, "intumescent material" means a material that expands, foams, or swells when exposed to a sufficient amount of thermal energy.

As used herein, "intumescent layer" means a layer of the sheet that contains an intumescent material.

As used herein, "non-intumescent layer" means a layer of the sheet that does not contain an intumescent material.

The non-moldable flexible intumescent layers of the present invention include compositions of materials that can be wet laid into flexible and resilient sheets. Generally, the non-moldable flexible intumescent layers of the invention comprise, by dry weight percent of the layer, from about 5 to about 85 percent intumescent material, and less than 20 percent organic binder.

The non-moldable flexible intumescent layer desirably comprises, on dry weight basis of the layer, from about 5 to about 85 percent intumescent material, from about 0.5 to about 15 percent organic binder, and from about 10 to about 65 percent inorganic fibers, and more desirably comprises from about 5 to about 70 percent intumescent material, from about 0.5 to about 9 percent organic binder, and from about 30 to about 45 percent inorganic fibers. The non-moldable flexible intumescent layers of the invention may also contain one or more inorganic fillers, inorganic binders, organic fibers, and mixtures thereof.

Another non-moldable flexible intumescent layer desirably comprises, by dry weight percent, about 20 percent to about 65 percent unexpanded vermiculite flakes or ore, about 10 percent to about 65 percent inorganic fibers, about 0.5 percent to about 20 percent organic binders, and up to 40 percent inorganic fillers.

Another non-moldable flexible intumescent layer desirably comprises, by dry weight percent, about 20 percent to about 90 percent expandable graphite, about 10 percent to about 65 percent inorganic fibers, about 0.5 percent to about 20 percent organic binders, and up to 40 percent inorganic fillers.

Another non-moldable flexible intumescent layer desirably comprises, by dry weight percent, about 20 percent to about 90 percent expandable sodium silicate, about 10 percent to about 65 percent inorganic fiber, about 0.5 percent to about 20 percent organic binders, and up to 40 percent inorganic filler.

Another non-moldable flexible intumescent layer desirably comprises, by dry weight percent, about 20 percent to about 90 percent of a mixture of expandable graphite and either treated or untreated unexpanded vermiculite, wherein the expandable graphite is from about 5 to about 95 dry weight percent of the intumescent mixture and said unexpanded vermiculite is from about 95 to about 5 dry weight percent of the intumescent mixture, about 10 percent to about 50 percent inorganic fibers, about 0.5 percent to about 20 percent organic binders, and up to 40 percent inorganic fillers.

The choice of the intumescent materials can vary depending on the desired end use. For example, for higher temperatures, that is, above about 500° C., unexpanded vermiculite materials are suitable since they start to expand at a temperature range of from about 300° C. to about 340° C. to fill the expanding gap between an expanding metal housing and a monolith in a catalytic converter. For lower temperature use, that is, temperatures below about 500° C., such as in diesel monoliths or particulate filters, expandable graphite or a mixture of expandable graphite and unexpanded vermiculite materials may be desired since expandable graphite starts to expand or intumesce at about 210° C. Treated vermiculites are also useful and expand at a temperature of about 290° C.

Useful intumescent materials include, but are not limited to, unexpanded vermiculite ore, treated unexpanded vermiculite ore, partially dehydrated vermiculite ore, expandable graphite, mixtures of expandable graphite with treated or untreated unexpanded vermiculite ore, processed expandable sodium silicate, for example EXPANTROL™ insoluble sodium silicate, commercially available from Minnesota Mining and Manufacturing Company, St. Paul, Minn., and mixtures thereof. For purposes of the present application, it is intended that each of the above-listed examples of intumescent materials are considered to be different and distinguishable from one another. Desired intumescent materials include unexpanded vermiculite ore, treated unexpanded vermiculite ore, expandable graphite, and mixtures thereof An example of a desirable commercially available expandable graphite material is GRAFOIL™ Grade 338-50 expandable graphite flake, from UCAR Carbon Co., Inc., Cleveland, Ohio.

Treated unexpanded vermiculite flakes or ore includes unexpanded vermiculite treated by processes such as by being ion exchanged with ion exchange salts such as ammonium dihydrogen phosphate, ammonium nitrate, ammonium chloride, potassium chloride, or other suitable compounds as is known in the art.

The amount and type of intumescent material incorporated into the mounting mat contributes significantly to the cost of the product. Untreated intumescent materials, such as unexpanded vermiculite, are generally less expensive than treated intumescent materials, but may provide different intumescing temperatures and amounts and rates of expansion. In one aspect, the present invention desirably produces significant intumescent expansion with a low proportion of intumescent material, such as from greater than 0 to less than about 30% intumescent particles by dry weight percent of the total mat. A well-timed and significant intumescent expansion is achieved by non-homogeneously positioning the intumescent particles in the outer layer or toward the outside of the mat.

Suitable organic binder materials include aqueous polymer emulsions, solvent based polymer solutions, and polymers or polymer resins (100 percent solids). Aqueous polymer emulsions are organic binder polymers and elastomers in the latex form, for example, natural rubber lattices, styrene-butadiene lattices, butadiene-acrylonitrile lattices, ethylene vinyl acetate lattices, and lattices of acrylate and methacrylate polymers and copolymers. Polymers and polymer resins include natural rubber, styrene-butadiene rubber, and other elastomeric polymer resins. Acrylic latex and polyvinyl acetate organic binders are preferred.

Examples of desirable commercially available organic binders include RHOPLEX® HA-8 (a 45.5 percent by weight solids aqueous acrylic emulsion) from Rohm & Haas, Philadelphia, Pa. and AIRFLEX® 600BP (a 55 percent solids aqueous polyvinyl acetate emulsion) from Air Products, Allentown, Pa.

Useful inorganic fibers include for example, fiberglass, ceramic fibers, non-oxide inorganic fibers, such as graphite fibers or boron fibers, and mixtures thereof Useful ceramic fibers include aliminoborosilicate fibers, aluminosilicate fibers, alumina fibers, and mixtures thereof.

Examples of desirable aluminoborosilicate fibers include those commercially available under the trade designations "NEXTEL" 312 and "NEXTEL" 440 from Minnesota Mining and Manufacturing Company, St. Paul, Minn. Examples of desirable aluminosilicate fibers include those available under the trade designations "FIBERFRAX" 7000M from Unifrax Corp., Niagara Falls, N.Y., "CERAFIBER" from Thermal Ceramics, Augusta, Ga.; and "SNSC Type 1260

D1" from Nippon Steel Chemical Company, Tokyo, Japan. An example of a desirable commercially available alumina fiber is SAFFIL™ fibers which are polycrystalline alumina fibers available from ICI Chemicals and Polymers, Widnes Chesire, UK.

Examples of other suitable inorganic fibers include: quartz fibers, commercially available, for example, under the trade designation "ASTROQUARTZ" from J.P. Stevens. Inc., Slater, N.C.; glass fibers, such as magnesium aluminosilicate glass fibers, for example, those commercially available under the trade designation "S2-GLASS" from Owens-Corning Fiberglass Corp., Granville, Ohio; silicon carbide fibers, for example, those commercially available under the trade designations "NICALON" from Nippon Carbon, Tokyo, Japan, or Dow Corning, Midland, Mich., and "TYRANNO" from Textron Specialty Materials, Lowell, Mass.; silicon nitride fibers, for example, those available from Toren Energy International Corp., New York, N.Y.; small diameter metal fibers, such as BEKI-SHIELD® GR 90/C2/4 stainless steel fibers, which are commercially available from Beckaert, Zweregan, Belgium and micrometal fibers under the trade designation "RIBTEC" from Ribbon Technology Corp., Gahanna, Ohio, and mixtures thereof Useful commercially available carbon (graphite) fibers (non-intumescent) include those under the trade designation "IM7" from Hercules Advanced Material Systems, Magna, Utah.

The non-moldable flexible intumescent layers of the present invention may also contain one or more filler materials. Filler materials may be present in the flexible intumescent layer at dry weight levels of up to about 90 percent, desirably at levels of up to about 60 percent, and more desirably at levels of up to 40 percent.

Suitable fillers and non-intumescent particles include for example, glass particles, hollow glass spheres, inert filler materials such as calcium carbonate, reinforcing and/or light weight filler materials such as mica, perlite, expanded vermiculite, processed expanded vermiculite platelets, delaminated vermiculite, endothermic filler materials such as aluminum trihydrate, magnesium phosphate hexahydrate, zinc borate, and magnesium hydroxide, and mixtures thereof.

The non-moldable flexible intumescent layers of the invention may also contain up to about 90 percent, desirably contain up to about 30 percent, and more desirably contain up to about 15 percent, by dry weight of the layer, inorganic binder. Useful inorganic binders include clay materials such as bentonite, and colloidal silicas, and mixtures thereof.

The non-moldable flexible intumescent layers of the invention may also contain up to about 90 percent, desirably contain up to about 10 percent, and more desirably contain up to about 3 percent, by dry weight, of organic fiber. Useful organic fibers include aramid fibers such as KEVLAR® polyamide fibers, thermo bonding fibers, for example Hoeschst Celanese HC-106 bicomponent fibers, and rayon fibers, polyolefin fibers, and mixtures thereof.

Other suitable examples of intumescent sheet materials having compositions suitable for use as a non-moldable flexible intumescent layer of the invention include those described in U.S. Pat. No. 3,916,057 (Hatch et al.), U.S. Pat. No. 4,305,992 (Langer et al.), U.S. Pat. No. 4,385,135 (Langer et al.), U.S. Pat. No. 5,254,410 (Langer et al.), U.S. Pat. No. 4,865,818 (Merry et al.), U.S. Pat. No. 5,151,253 (Merry et al.), U.S. Pat. No. 5,290,522 (Rogers et al.), and U.S. Pat. No. 5,523,059 (Langer), each of which are hereby incorporated by reference.

The multilayer flexible sheet of the present invention may also include at least one non-moldable flexible non-intumescent layer. Generally, the non-moldable flexible non-intumescent layers may contain at least one of inorganic fibers, organic binder, filler materials, organic fiber or may contain any combination thereof. Useful non-intumescent layers include combinations of inorganic fiber and organic binder, and organic binder and organic fiber.

A suitable non-moldable flexible non-intumescent layer comprises, by dry weight percent, about 10 percent to about 99.5 percent inorganic fibers, about 0.5 percent to about 20 percent organic binders, and up to 90 percent fillers. A desirable flexible non-intumescent layer comprises, by dry weight percent, from about 20 to about 99.5 percent inorganic fibers, about 0.5 to 20 percent organic binder and up to 60 percent fillers. The non-moldable flexible non-intumescent layer of the invention may also contain one or more organic fibers, inorganic binders, and mixtures thereof.

Inorganic fibers useful in the non-moldable flexible non-intumescent layers of the present invention include those described above and particularly aluminosilicate fibers, commercially available under the trademarks "FIBER-FRAX" 7000M from Unifrax Co., Niagara Falls, N.Y.; "CERAFIBER" from Thermal Ceramics, Augusta, Ga.; polycrystalline alumina fibers commercially available as SAFFIL™ fibers from ICI Chemicals and Polymers, Widnes Chesire, UK; and others such as glass fibers, zirconia-silica fibers, crystalline alumina whiskers, and microfiberglass, available from Schuller International Co., Denver, Colo.; high temperature fiberglass such as under the trade designation of "S-2 GLASS" HT from Owens-Corning, and mixtures thereof.

Generally speaking, inorganic fibers containing a substantial amount of shot are less expensive than shot-free inorganic fibers. However, as discussed in U.S. Pat. No. 4,929,429, incorporated herein by reference, shot-free inorganic fibers generally provide more resilient mats which better maintain holding forces at all temperatures including a return to room temperature. The type of inorganic fibers used also affect the cost. Generally speaking, alumina/silica inorganic fibers, such as about 50% alumina, 50% silica fibers, are relatively inexpensive.

In one aspect the present invention includes a mixture of shot-free inorganic fiber and inorganic fiber with shot. This mixture is desirably used in both the non-intumescent layer and the intumescent layer. In so using the mixture, the shot-free inorganic fiber of the outer layer is of the same type as the shot-free inorganic fiber of the inner layer, and the inorganic fiber with shot of the outer layer is of the same type as the inorganic fiber with shot of the inner layer. Also, the relative proportions of shot-free inorganic fiber to inorganic fiber with shot are the same for both the inner layer and the outer layer. This is believed to result in more consistent thermal conductivity and specific heats throughout both layers.

The mixture may include, by dry weight percent, at least about 40% inorganic fiber with shot, up to about 98% inorganic fiber with shot or from 10 to 78% of the inorganic fiber with shot. The shot content may be greater than about 10%, more desirably greater than about 25%, and most desirably about 50% of the inorganic bulk content, such as a 50% fiber, 50% shot bulk. The inorganic fiber may be alumina/silica fibers, such as about 50% alumina, 50% silica fibers.

The mixture may include more than 0% shot-free inorganic fiber, up to about 50% shot-free inorganic fiber or from more than 0 to 40% of shot-free inorganic fiber. The present invention desirably includes from more than 0% to about 30% shot-free inorganic fiber, by dry weight percent of the layer. The present invention even more desirably uses a mix of about 25% shot-free inorganic fiber, 75% inorganic fiber with shot as a dry weight percent of the inorganic fiber content. The present invention desirably uses a high alumina fiber for the shot-free inorganic fiber, such as an about 96% alumina fiber. Higher ranges of shot-free inorganic fiber may also be used, but the present invention produces beneficial results even though small portions of shot-free inorganic fiber are used.

Organic binders useful in the non-moldable flexible non-intumescent layers of the present invention include those described above and particularly natural rubber lattices, poly vinylacetate, styrene-butadiene lattices, butadiene acrylonitrile lattices, and lattices of acrylate and methacrylate polymers and copolymers.

Fillers useful in the non-moldable flexible non-intumescent layers of the present invention include those described above and particularly expanded vermiculite, delaminated vermiculite, hollow glass microspheres, perlite, and others such as alumina trihydrate, magnesium phosphate hexahydrate, calcium carbonate, and mixtures thereof. Filler materials may be present in the flexible non-intumescent layer at dry weight levels of up to about 90 percent, desirably at levels of up to about 60 percent, and more desirably at levels of up to 40 percent.

Inorganic binders useful in the non-moldable flexible non-intumescent layers of the present invention include those described above for the non-moldable flexible intumescent layers and particularly bentonite and other clays. Inorganic binders may be present in the non-moldable flexible layers at levels up to about 90 percent, desirably up to about 30 percent, and more desirably, up to about 15 percent by dry weight of the layer.

Organic fibers useful in the non-moldable flexible non-intumescent layers of the present invention include those described above for the non-moldable flexible intumescent layers. Organic fibers may be present in the non-moldable flexible layers of the invention at levels up to about 90 percent, desirably up to about 10 percent, and more desirably, up to 3 percent by dry weight percent of the layer.

Other additives or process aides that may be included in any one of the layers of the invention include defoaming agents, surfactants, dispersants, wetting agents, salts to aid precipitation, fungicides, and bactericides. Generally, these types of additives are included in one or more of the layers in amounts of less than about 5 dry weight percent.

Desirably, the multilayer sheets of the invention are made by making at least two dilute (desirably, not over 5 percent solids by weight) aqueous slurries containing the desired materials, depositing the first slurry onto a permeable substrate, such as a screen or a "wire" of a papermachine, partially dewatering the first slurry by gravity and/or vacuum to form a base or "lower" layer, depositing the second slurry onto the partially dewatered lower layer, partially dewatering the second or top layer, and then pressing to density both layers with, for example, pressure rollers and then fully drying the sheet with heated rollers, to form the finished sheet. It is to be understood that either or any of the layers of the sheet of the present invention may be formed first as the lower layer of the sheet. However, the layer having the greatest thickness when dry (such as the inner non-intumescent layer) is desirably the layer that is formed first.

The steps of depositing and then dewatering a slurry onto a partially dewatered layer provides a partial intermingling of the components of both slurries. This intermingling permanently and effectively bonds the layers together to form a one-piece sheet where the layers may not be cleanly separated. The intermingling of the layer components may be practically invisible to the eye or may be to such an extent so as to form a visible boundary or gradient layer between the two layers. In either case, the layers are permanently bound to one another and form a single sheet with each layer being a portion of the whole sheet. Depositing a second layer slurry onto a first layer slurry as the first layer slurry is being dewatered results in a high amount of intermingling between the layers. Depositing a second layer slurry onto a partially dewatered and first-formed layer provides two distinct, but bound layers with little visible intermingling. The former is generally accomplished by depositing and then dewatering both slurries in close sequence using vacuum dewatering on an inclined wire section of a wire former. The latter is generally accomplished by depositing and vacuum forming the lower layer on the inclined section of a wire former and then depositing and dewatering the top layer by sufficient vacuum (through the lower layer) on a planar or flat portion of a wire former. The top layer should be dewatered at a sufficient rate so as to prevent undesirable settling out of the intumescent or other higher density filler materials. A sufficient dewatering rate will provide layers having homogeneous compositions outside of the "intermingled" or "gradient" layer.

Generally, when making the slurries, the higher density materials such as the intumescent materials and higher density fillers (if used) are added to the slurries in a smaller volume mixing vessel at a constant rate just prior to the depositing step. The slurries containing the fillers and intumescent materials are agitated sufficiently so to prevent these particles from settling out in the mixing tank prior to forming the individual layers. Such slurries should be partially dewatered almost immediately after being deposited on the wire so to prevent undesirable settling of the higher density particles. Vacuum dewatering of the slurries is desirable.

After the partially dewatered multilayered sheet is formed, the sheet is dried to form an end-use product. Useful drying means include wet pressing the sheet material through compression or pressure rollers followed by passing the sheet material through heated rollers and forced hot air drying as is known in the art.

The multilayer sheets of the invention may be made using fourdrinier machines having both an inclined and a flat wire section and a second headbox in addition to the headbox ordinarily furnished with such machines. The multilayer sheets of the invention may also be made on any commercially available inclined wire former designed to make multi-ply sheets, for example, a DOUMAT™ DELTAFORMER™ from Sandy Hill Corp., Hudson Falls, N.Y. A desirable fourdrinier machine has both an inclined screen area and a subsequent flat or horizontal screened area where the "second" layer may be deposited from a second headbox onto the lower layer and then dewatered using vacuum.

Additionally, the multilayer sheets of the invention can further include edge protection materials. Suitable materials include a stainless steel wire screen wrapped around the edges as described in U.S. Pat. No. 5,008,086 (Merry), incorporated herein by reference, and braided or rope-like ceramic (that is, glass, crystalline ceramic, or glass-ceramic) fiber braiding or metal wire material as described in U.S.

Pat. No. 4,156,533 (Close et al.), incorporated herein by reference. Edge protectants can also be formed from compositions having glass particles as described in EP 639 701 A1 (Howorth et al.), EP 639 702 A1(Howorth et al.), and EP 639 700 A1 (Stroom et al.), all of which are incorporated herein by reference.

In another aspect, the invention provides a pollution control device, for example, a catalytic converter or a diesel particulate filter, using a multilayer sheet of the invention. FIG. 1 shows a catalytic converter 10 similar to that disclosed in U.S. Pat. No. 4,865,818 to Merry et al. but incorporating a preferred embodiment of the present invention. The catalytic converter 10 contains a catalyst which is typically coated onto a monolithic structure 20 mounted in the converter 10. The monolithic structure 20 is typically ceramic, although metal monoliths have been used. The catalyst oxidizes carbon monoxide and hydrocarbons, and reduces the oxides of nitrogen in automobile exhaust gas to control atmospheric pollution.

The catalytic converter 10 includes a metal housing 11 which holds within it the monolithic structure 20. The housing 11 has inlet and outlet ends 12 and 13, respectively.

The monolithic structure 20 generally has very thin walls to provide a large amount of surface area so it is fragile and susceptible to breakage. The monolithic structure 20 also has a coefficient of thermal expansion generally an order of magnitude less than the metal (usually stainless steel) housing 11 in which it is contained. In order to avoid damage to the monolith 20 from shock and vibration, to compensate for the thermal expansion difference, and to prevent exhaust gasses from passing between the monolith 20 and the metal housing 11, an intumescent sheet material mat 30 according to the present invention is disposed between the monolithic structure 20 and the metal housing 11. The sheet material 30 may have a first end 31 and a second end 32.

The housing 11, which is also referred to as a can or a casing, can be made from suitable materials known in the art for such use and is typically made of metal. Desirably, the housing 11 is made of stainless steel.

Suitable catalytic converter elements 20, also referred to as monoliths, are known in the art and include those made of metal or ceramic. The monoliths or elements 20 are used to support the catalyst materials for the converter 10. A useful catalytic converter element is disclosed, for example, in U.S. Pat. No. RE 27,747 (Johnson), incorporated by reference.

Ceramic catalytic converter elements are commercially available, for example, from Corning Inc., Corning, N.Y., and NGK Insulator Ltd., Nagoya, Japan. For example, a honeycomb ceramic catalyst support is marketed under the trade designation "CELCOR" by Corning Inc. and "HONEYCERAM" by NGK Insulator Ltd. Metal catalytic converter elements are commercially available from Behr GmbH and Co., Germany.

The monolith 20 of the present invention may particularly be an extremely thin walled ceramic element. As used in this application, an "extremely thin walled" monolith is one having a wall thickness of less than 6 mils (less than 0.15 mm). The extremely thin wall monolith 20 may even more desirably be one having a wall thickness of 4 mils or less (0.10 mm or less), such as for example a 1/400, 1/600, 4/900, 3/600, 3/900 or 2/900 monolith.

For additional details regarding catalytic monoliths see, for example, "Advanced Ceramic Substrate: Catalytic Performance Improvement by High Geometric Surface Area and Low Heat Capacity," Umehara et al., Paper No. 971029, SAE Technical Paper Series, 1997; "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

The catalyst materials coated onto the catalytic converter elements include those known in the art (for example, metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.).

Figure 2:
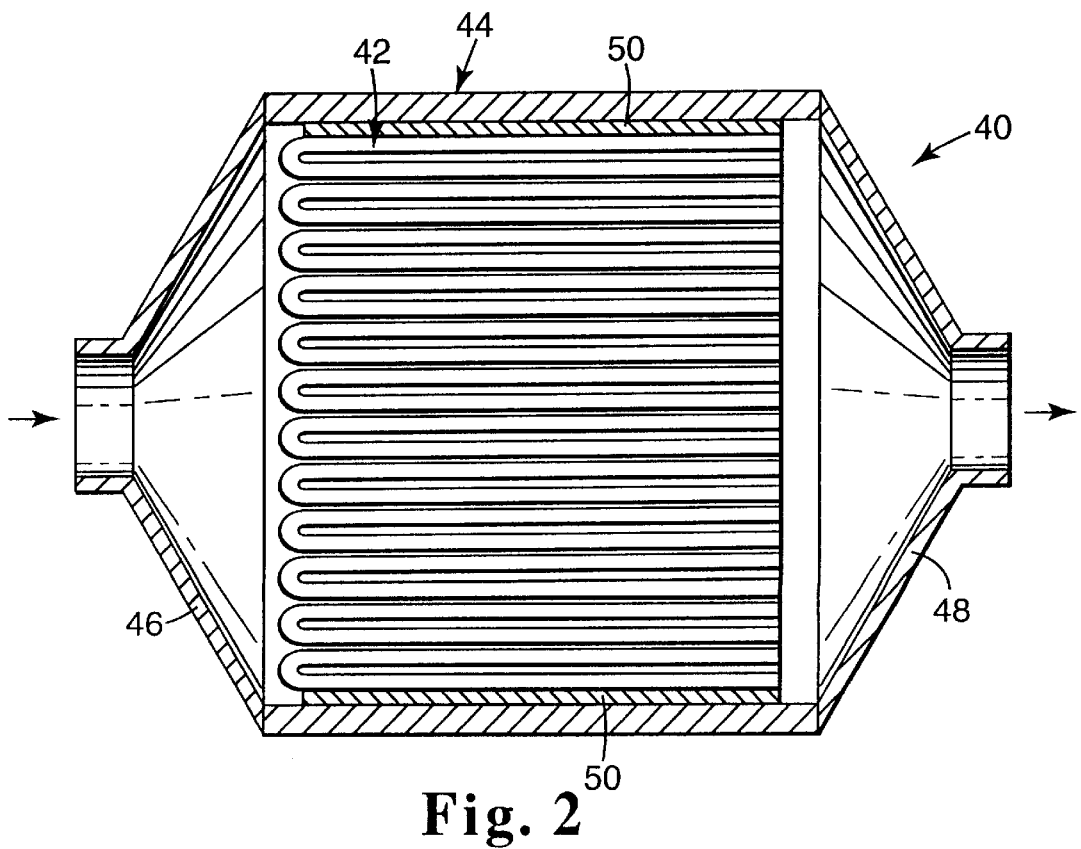
FIG. 2 is a longitudinal central section through a diesel particulate filter incorporating a preferred embodiment of the present invention.

FIG. 2 shows a diesel particulate filter 40 similar to that disclosed in U.S. Pat. No. 5,174,969 to Fischer et al. but incorporating a preferred embodiment of the present invention. The diesel particulate filter or trap 40 is a wall flow filter which has a honeycombed monolithic structure 42 comprising a bundle of tubes. A catalyst is typically coated onto the monolithic structure 42 mounted in the diesel particulate filter 40. The catalyst oxidizes carbon monoxide and hydrocarbons, and reduces the oxides of nitrogen in diesel engine exhaust gas to control atmospheric pollution.

The diesel particulate filter 40 includes a metal housing 44 which holds within it the monolithic structure 42. The housing 44 has inlet and outlet ends 46 and 48, respectively. The monolithic structure 42 generally has very thin walls to provide a large amount of surface area so it is fragile and susceptible to breakage. The monolithic structure 42 also has a coefficient of thermal expansion generally an order of magnitude less than the metal (usually stainless steel) housing 44 in which it is contained. In order to avoid damage to the monolith 42 from shock and vibration, to compensate for the thermal expansion difference, and to prevent exhaust gasses from passing between the monolith 42 and the metal housing 44, an intumescent sheet material mat 50 according to the present invention is disposed between the monolithic structure 42 and the metal housing 44.

Useful monolithic type diesel particulate filter elements 42 are typically wall flow filters comprised of honeycombed, porous, crystalline ceramic (for example, cordierite) material. Alternate cells of the honeycombed structure are typically plugged such that exhaust gas enters in one cell and is forced through the porous wall of one cell and exits the structure through another cell. The size of the diesel particulate filter element 42 depends on the particular application needs. Useful diesel particulate filter elements are commercially available, for example, from Corning Inc., Corning, N.Y., and NGK Insulator Ltd., Nagoya, Japan. Useful diesel particulate filter elements are discussed in "Cellular Ceramic Diesel Particulate Filter," Howitt et al., Paper No. 810114, SAE Technical Paper Series, 1981.

In use, the multilayer sheet 30, 50 of the invention is disposed between the monolith 20, 42 and the housing 11, 44 in similar fashion for either a catalytic converter 10 or for a diesel particulate filter 40. This may be done by wrapping the monolith 20, 42 with the multilayer sheet 30, 50 of the invention, inserting the wrapped monolith into the housing 11, 44, and sealing the housing 11, 44. The intumescent multilayer sheet 30, 50 holds the monolith 20, 42 in place within the housing 11, 44 and seals the gap between the monolith 20, 42 and the housing 11, 44 to prevent exhaust gases from bypassing the monolith 20, 42.

The multilayer sheet 30, 50 is significantly compressed between the monolith 20, 42 and the housing 11, 44. For instance, the thickness of the multilayer sheet is generally from greater than 100% to about 400% of the circumferential gap. The compression of the multilayer sheet 30, 50 provides an initial mounting pressure which is desirably between about 20 and 500 kPa. The compression also increases the density of the multilayer sheet to a desirable mount density of about 0.3 to 0.6 g/cc, more desirably to a mount density of about 0.4 to 0.5 g/cc, and most desirably to a mount density of about 0.45 g/cc.

The mats 30, 50 are multilayer sheets comprising (a) at least one non-moldable flexible layer that may be non-intumescent or intumescent; and (b) at least one non-moldable flexible intumescent layer comprising an intumescent material, said layers desirably forming a single sheet without the use of auxiliary bonding means.

An example of a multilayer sheet 30 suitable for use in a catalytic converter 10 comprises a non-moldable flexible non-intumescent layer comprising ceramic fiber and organic binder, and a non-moldable flexible intumescent layer comprising unexpanded vermiculite, ceramic fiber, and organic binder.

An example of a multilayer sheet 50 suitable for use in a diesel particulate filter 40 comprises a first non-moldable flexible intumescent layer comprising ceramic fiber, unexpanded vermiculite, and organic binder, and a second non-moldable flexible intumescent layer comprising ceramic fiber, expandable graphite, and organic binder.

The orientation of the multilayer sheet between the housing and the monolith is dependent on the compositions of the layers of the sheet. For example, the intumescent layer of a sheet of the invention containing an intumescent material such as expandable graphite would advantageously be placed adjacent to a diesel monolith. This is because diesel particulate filters are typically heated to temperatures below about 500° C. and expandable graphite starts to expand at a temperature of about 210° C.

During use of the pollution control device, the mounting mat should remain resilient at all operating temperatures, for a large number of thermal cycles. In one aspect, the present invention provides a maximum mounting pressure of less than about 500 kPa, and a minimum mounting pressure of greater than about 15 kPa. It may also be desirable for the minimum mounting pressure being provided to be greater than about 20 kPa. In another aspect, the present invention provides a low level of erosion, such as an initial erosion rate of less than about 0.1 g/hour, and more desirably an initial erosion rate of less than about 0.05 g/hour, and most desirably an initial erosion rate of about 0.01 g/hour or less.

In another aspect, the invention provides a multilayer sheet material useful as a firestop for limiting the spread of fire through openings in the walls, floors, and ceilings of structures.

An example of a multilayer intumescent sheet useful as a firestop comprises a first non-moldable flexible intumescent layer comprising unexpanded vermiculite, organic binder and alumina trihydrate, and a second non-moldable flexible intumescent layer comprising expandable graphite, organic binder, and aluminum trihydrate wherein said layers form a single sheet without the use of auxiliary bonding means.

An example of a desirable multilayer sheet material for use as a firestop comprises a non-moldable flexible layer comprising alumina trihydrate as described in U.S. Pat. No. 4,600,634, incorporated by reference herein, and a non-moldable flexible intumescent layer comprising an intumescent material, wherein said layers form a single sheet without the use of auxiliary bonding means.

In use, a multilayer sheet of the invention useful as a firestop is desirably oriented such that the layer containing the intumescent material faces toward the side most likely to get hot.

The present invention also contemplates intumescent sheets having three or more layers wherein at least one layer comprises an intumescent material and wherein adjacent layers are desirably comprised of different compositions.

Real Condition Fixture Test (RCFT)

The RCFT is a test which models actual conditions found in a catalytic converter (automotive or diesel) with a monolith (metal or ceramic), or in a diesel particulate trap during normal use, and measures the pressure exerted by the mounting material under those modeled normal use conditions.

Two 50.8 mm by 50.8 mm heated stainless steel platens, controlled independently, are heated to different temperatures to simulate the metal housing and monolith temperatures, respectively. Simultaneously, the space or gap between the platens increased by a value calculated from the temperature and the thermal expansion coefficients of a typical catalytic converter of the type specified. The temperatures of the platen and the gap are presented in Tables 1 and 2 below. The pressure force exerted by the mounting material is measured by a Sintech ID computer-controlled load frame with an Extensometer available from MTS Systems Corp., Research Triangle Park, N.C.

TABLE 1

| Monolith Temperature (C.) | Shell Temperature (C.) | Gap Change (cm) |
|---|---|---|
| 25 | 25 | 0.0000 |
| 63 | 30 | 0.0001 |
| 100 | 35 | 0.0003 |
| 150 | 40 | 0.0003 |
| 200 | 55 | 0.0012 |
| 200 | 120 | 0.0068 |
| 200 (soak) | 120 | 0.0068 |
| 150 | 90 | 0.0046 |
| 100 | 60 | 0.0024 |
| 63 | 42 | 0.012 |
| 25 | 25 | 0.000 |

The above Table 1 conditions model a 12.7 cm. diameter ceramic monolith with a 409 stainless steel shell and is representative of the conditions found in a diesel catalytic converter with a ceramic monolith.

TABLE 2

| Time Interval | Monolith Temperature (C.) | Shell Temperature (C.) | Gap Change (cm) |
|---|---|---|---|
| a | 25 | 25 | 0.0003 |
| b | 100 | 25 | 0.0003 |
| c | 150 | 30 | 0.0003 |
| d | 200 | 35 | 0.0003 |
| e | 250 | 38 | 0.0003 |
| f | 300 | 40 | 0.0003 |
| g | 350 | 45 | 0.0003 |
| h | 400 | 50 | 0.0003 |
| i | 450 | 60 | 0.0003 |
| j | 500 | 70 | 0.0003 |
| k | 550 | 85 | 0.0013 |
| l | 600 | 100 | 0.0025 |
| m | 650 | 125 | 0.0038 |
| n | 700 | 150 | 0.0051 |

TABLE 2-continued

| Time Interval | Monolith Temperature (C.) | Shell Temperature (C.) | Gap Change (cm) |
|---|---|---|---|
| o | 750 | 185 | 0.0076 |
| p | 800 | 220 | 0.0102 |
| q | 850 | 325 | 0.0165 |
| r | 900 | 430 | 0.0229 |
| s | 900 | 480 | 0.0267 |
| t | 900 | 530 | 0.0305 |
| u | 900 (soak) | 530 | 0.0305 |
| v | 850 | 502 | 0.0292 |
| w | 800 | 474 | 0.0279 |
| x | 750 | 445 | 0.0254 |
| y | 700 | 416 | 0.0229 |
| z | 650 | 387 | 0.0216 |
| aa | 600 | 358 | 0.0203 |
| bb | 550 | 329 | 0.0191 |
| cc | 500 | 300 | 0.0178 |
| dd | 450 | 275 | 0.0165 |
| ee | 400 | 250 | 0.0152 |
| ff | 350 | 215 | 0.0127 |
| gg | 300 | 180 | 0.0102 |
| hh | 250 | 155 | 0.0089 |
| ii | 200 | 130 | 0.0076 |
| jj | 150 | 95 | 0.0051 |
| kk | 100 | 60 | 0.0025 |
| ll | 50 | 50 | 0.0003 |

The above Table 2 conditions model a ceramic monolith with a stainless steel shell and an initial 4 mm gap and is representative of the conditions found in an automotive catalytic converter during a full heating and cooling cycle. For instance, the Table 2 conditions model a cycle such as driving the automobile over a substantial distance to allow the engine to fully warm up, and the turning the engine off and allowing the engine to fully cool back to ambient conditions. Such a thermal cycle will typically occur hundreds or thousands of times during the life of the vehicle.

Figure 3:
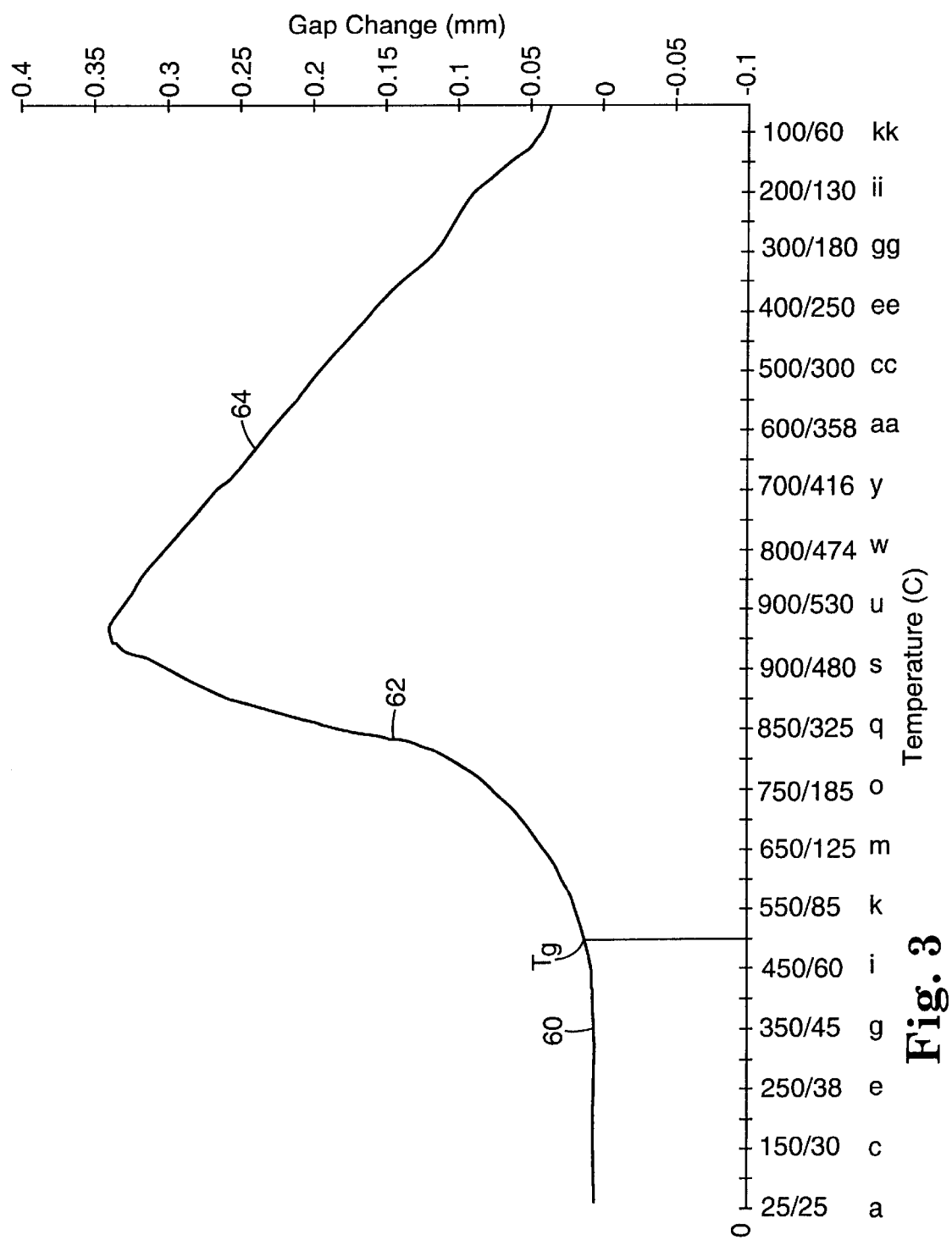
FIG. 3 is a plot of gap change vs. heating/time interval for the real condition fixture test of Table 2.
Figure 4:
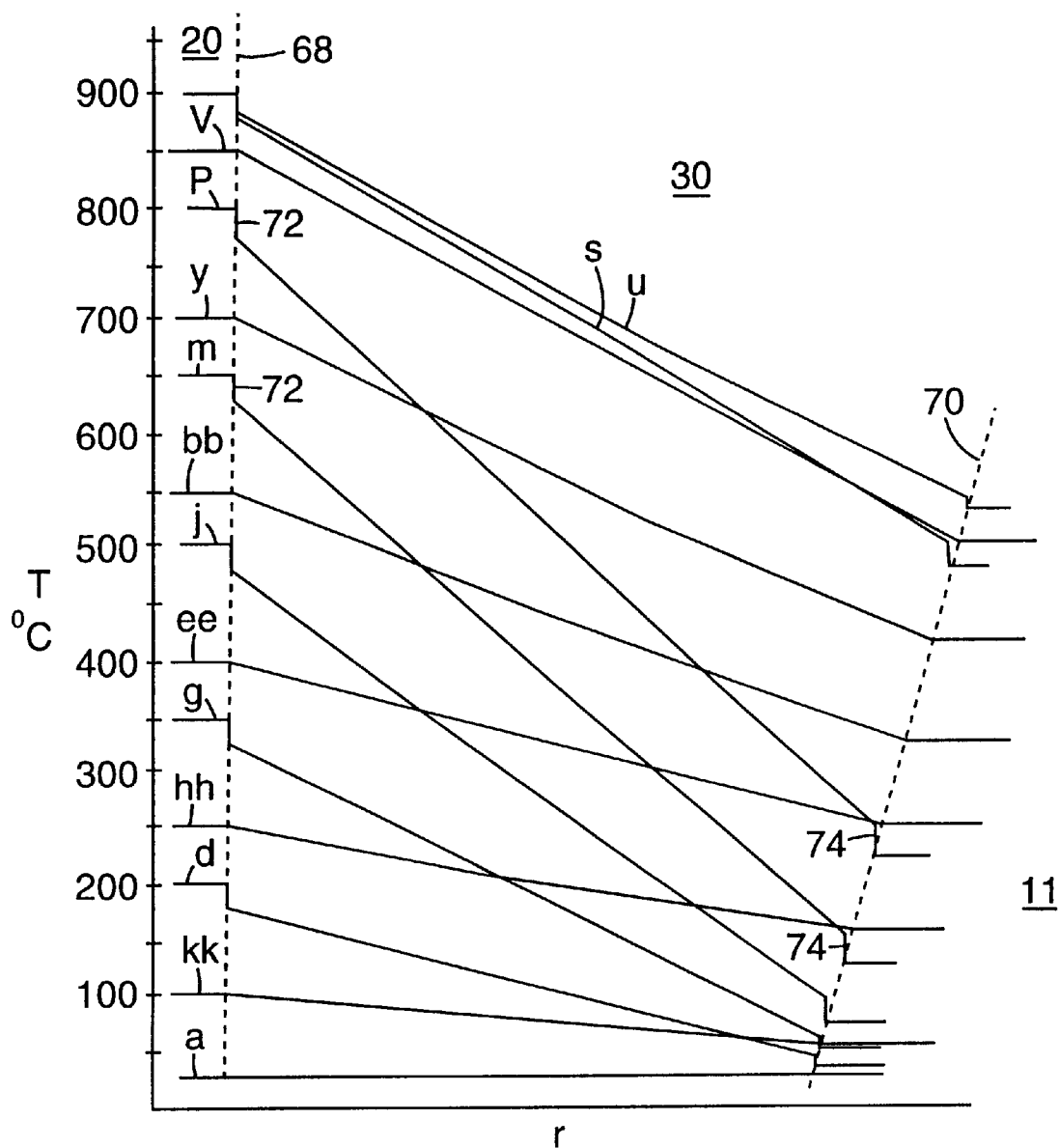
FIG. 4 is a temperature vs. radial location vs. heating/time interval graph for the real condition fixture test of Table 2.

FIGS. 3 and 4 are graphical representations of the above Table 2 real condition fixture test. A detailed understanding of how the thermal conditions exist in an actual catalytic converter is useful toward understanding how the mounting mats of the present invention show improved results over prior art mounting mats.

The relationship between the gap filled by the mounting material and the operating temperature of the ceramic monolith at any particular time is a complex, non-linear phenomenon. As shown in FIG. 3, the gap change during a full thermal running cycle can be characterized into three basic portions. During initial low temperature heating (i.e., from time/heating interval "a" to time/heating interval "j", during initial running of the engine), the gap has a no change portion 60. During high temperature heating (i.e., from time/heating interval "k" to time/heating interval "u", as the engine approaches steady state thermal operating conditions), the gap undergoes a high increase portion 62. The high gap increase portion 62 begins at a temperature $T_g$, the lowest temperature of the monolith 20 at which a substantial increase in gap size is observed. During cool down (i.e., from time/heating interval "v" to an ambient temperature, after the engine is shut off and the engine allowed to cool), the gap undergoes a steady decline portion 64. It is recognized that if the engine is run for less than a full thermal cycle, or restarted before the engine has fully cooled, then the various portions 60, 62, 64 will be intermingled.

The relationship between gap change and ceramic monolith temperature is further explained with reference to FIG. 4. The monolith surface temperatures and housing surface temperatures for selected time/heating intervals are based on measurements taken during an actual engine heating and cooling of a catalytic converter. The temperature verses radial location in the mounting mat as a function of time during the heating/cooling cycle of the engine is modeled based on several assumptions.

The location of the monolithic wall 20 moves radially outward as a function of temperature according to its coefficient of thermal expansion 68, which determines the slope of line 68. Due to the relatively low coefficient of the thermal expansion 68 of the monolith 20, the radial location of the edge of the monolith 20 changes very little during its heating cycle from 25° C. to 900° C. The location of the housing wall 11 also moves radially outward outward as a function of temperature, but at a significantly greater slope due to its higher coefficient of thermal expansion 70. Due to its relatively larger coefficient of expansion 70, the radial location of the peripheral wall 11 changes significantly during its heating cycle from 25° C. to 530° C.

A temperature differential 72 is believed to exist at least during the heating cycle due to thermal contact resistance at the interface between the monolith 20 and the mounting mat 30. Similarly, at least during the heating cycle, a temperature differential 74 is believed to exist due to thermal contact resistance between the mounting mat 30 and the peripheral wall of the housing 11. Thermal contact resistances also exist during steady state (time/heating interval "u") and cooling (time/heating intervals "v" to "ll"), but are believed to result in significantly smaller temperature differentials. The magnitude of the thermal contact resistances and resultant temperature differentials 72, 74 is not known and will vary from system to system based on the molecular interaction between the material of the mounting mat 30 and materials of the ceramic monolithic 20 and housing 11. The temperature differentials 72, 74 are believed to be fairly small relative to the overall temperature drop from the monolith 20 to the housing 11.

For simplicity, temperature distributions through the mounting mat 30 are modeled as linearly decreasing. It is recognized that the radial nature of the heat transfer in most catalytic converter systems will provide a curvature to each of the temperature distribution lines, but the magnitude of the curvature is quite small because the radius of the mat 30 is quite small relative to its thickness. Additionally, the heat transfer is transient, which will also affect the amount of curvature of the temperature profiles through the mat 30. The temperature distribution shown in FIG. 4 is based on a constant value for the coefficient of thermal conduction through the mounting mat 30, without any interfaces in the mat 30. While the noted assumptions change based on the particular circumstances of each mounting mat, the temperature distribution profile shown in FIG. 4 is sufficient for explanatory purposes of the present invention.

As the ceramic monolith 20 is initially heated, a time dependent thermal gradient sets up across the mounting mat 30. During the typical heating cycle of the monolith 20 from 25° C. (ambient) to 500° C. (i.e., from time interval "a" to time interval "j", $T_m$=475° C.), the housing 11 only increases in temperature a relatively small amount, from 25° C. to 70° C. ($T_h$=45° C.). Much of the initial heat from the monolith 20 is not directly transmitted to the housing 11, but rather is absorbed in increasing the temperature of the mounting mat 30 as a function of the mounting mat's specific heat. Additionally, the conduction of heat through the mounting mat 30 does not occur instantaneously, but rather takes time as a function of the coefficient of thermal conduction through the mounting mat 30. These factors create a thermal "lag" of heating from the monolith 20 to the housing 11.

The coefficient of thermal expansion 70 of the metal housing 11 is about 10 times the coefficient of thermal expansion of the ceramic monolith 20. During the heating/time interval "a" to "j", the difference between $T_m$ and $T_h$ is equally offset by the difference in coefficients of thermal expansion 68, 70, and the gap remains substantially constant.

During high temperature heating as the engine approaches steady state thermal operating conditions, the thermal "lag" extends out or catches up to considerably raise the temperature of the housing 11. During heating of the monolith 20 from 550° C. to 900° C. (i.e., from time interval "k" to time interval "u", $T_m$=350° C.), the housing 11 increases in temperature a relatively large amount, from 85° C. to 530° C. ($T_h$=445° C.). The higher coefficient of thermal expansion 70 of the metal housing 11 combines with the greater temperature change, and the gap increases considerably.

During cooling, there is no source of heat for the monolith 20, and the temperature profile is due to the time necessary to dissipate the thermal energy stored in the catalytic converter. Thermal "lag" effects are seen equally at both the inside and the outside of the mounting mat 30, and the temperature gradient across the mounting mat 30 has a significantly shallower slope. During cooling of the monolith 20 from 900° C. to 50° C. (i.e., from time interval "u" to time interval "11", $T_m$=850° C.), the housing 11 decreases in temperature commensurately, from 530° C. to 50° C. ($T_h$=480° C.). The higher coefficient of thermal expansion 70 of the metal more than offsets the smaller temperature change, and the gap decreases slowly.

The ideal mounting mat will have expansion properties which mirror the change in gap size at the various thermal temperatures reached for the ceramic monolithic and the peripheral wall. Additionally, the mounting mat will have resiliency properties which remain substantially constant regardless of thermal cycling and any compression cycling. Heating and thermal cycling of the mat should not cause brittleness nor decrease erosion resistance. It is desired to produce a mounting mat which is low in cost, while maintaining a substantially constant holding force at all gap changes. The present invention allows the thermal expansion properties of the intumescent materials to be better utilized relative to the change in the gap.

Thickness Measurement

The thickness of the flexible non-moldable sheets is measured by placing a 2½ inch (6.35 centimeter) diameter deadweight exerting 0.7 psi (4.8 kPa) upon the sheet and measuring the compressed thickness. As used herein, the "thickness" of the sheets or layers is determined by this measurement, even though the sheets are compressed with substantially greater forces in installation between the ceramic monolithic 20 and the peripheral wall of the metal housing 11. Comparisons between the thickness of the outer layer and the thickness of the inner layer can be made at any circumferential location on the mat 30, 50.

The thickness measurement is also taken prior to the first and subsequent heating cycles which cause expansion of the unexpended vermiculite or other intumescent material. As will be further explained, the compressive force (and hence the uncompressed thickness of the mat 30, 50) can change based on the compression and heating history of the mat 30, 50.

Cold Erosion Test

This test is an accelerated test conducted under conditions that are more severe than actual conditions in a catalytic converter provides comparative data as to the erosion resistance of a mat mounting material.

A test sample is cut into a square measuring 2.54 cm by 2.54 cm, weighed, and mounted between two high temperature Inconel 601 steel plates using spacers to obtain a mount density of 0.700+/−0.005 g/cm$^3$. The test assembly is then heated for two hours at 800° C. and cooled to room temperature. The cooled test assembly is then positioned 3.8 mm in front of an air jet oscillating back and forth over the edge of the mat at 20 cycles per minute. The test is discontinued after 0.2 grams of material is lost or after 24 hours, whichever occurs first. The air jet impinges on the mat at a velocity of 305 meters per second. The erosion rate is determined by the weight loss divided by the time of the test and is reported in grams/hour (g/hr).

EXAMPLES

The examples described below were made on a fourdrinier papermaking machine having an inclined wire section and a subsequent flat wire section. The inclined wire section was inclined at an angle of 23 degrees from horizontal. A first headbox was mounted on the inclined wire section. A second headbox was mounted either on the inclined wire section in the slurry pond of the first headbox or on the flat wire section. The headboxes provide a slurry pond zone wherein the flow rate of the slurry onto the moving wire can be controlled. Vacuum sources or boxes were placed below and slightly in front of each headbox for dewatering the slurries when they were deposited onto the wire section. To prevent undesirable settling out of relatively dense filler and intumescent particles during the deposition of the slurries onto the wire, the vacuum boxes were placed in close proximity to the headboxes such that dewatering of the slurries coincided with the deposition of the slurries on the wire. The fourdrinier machine was connected via a conveyer belt to a conventional wet pressing roll and a series of conventional steam-heated drying rolls and finally to a conventional winding roll. Conventional pumps were used to pump the slurries to each of the headboxes and the pump rates were controlled using flow controllers.

Examples 1–5

One-hundred pounds (45.4 kg) of ceramic fibers (FIBERFRAX™ 7000M, available from Unifrax Co., Niagara Falls, N.Y.) were slushed in 960 gallons (3,634 L) of water in a Mordon Slush-Maker for one minute. The fiber slush was transferred to a 2000 gallon (7,520 L) chest and diluted with an additional 140 gallons (526 L) of water. Thirty-nine pounds (17.7 kg) of 45.5 percent solids latex (RHOPLEX® HA-8, available from ROHM & HAAS, Philadelphia, Pa.) was added while mixing. Eleven pounds (5.0 kg) of aluminum sulfate (50 percent solids) was then added to coagulate the latex. This latex-fiber slurry is hereafter referred to as formula "A".

A second slurry was prepared by slushing 100 pounds (45.4 kg) of ceramic fibers (FIBERFRAX™ 7000M) in 960 gallons (3,634 L) of water and mixing for one minute. Forty-three pounds (19.5 kg) of expanded vermiculite (ZONOLITE® #5, available from W.R. Grace Co., Cambridge, Mass.) were added to the slushed fibers and mixed until dispersed. The fiber-expanded vermiculite slurry was pumped to a 1500 gallon (5,678 L) chest and diluted with an additional 140 gallons (526 L) of water. Thirty-nine pounds (17.7 kg) of latex (RHOPLEX® HA-8, 45.5 percent solids) was added while mixing and 11 pounds (5.0 kg) of alum (50 percent solids) was added to coagulate the latex. This slurry is hereafter referred to as formula "B".

The formula A and B slurries were metered to separate 50 gallon (189 L) mixing tanks where unexpanded vermiculite having a mesh size of between 20 and 50 mesh, referred to as "V" below, and expandable graphite (GRAFOIL® Grade 338-50 expandable graphite flake, available from UCAR Carbon Co., Inc., Cleveland, Ohio), referred to as "G" below, were metered and mixed into the "A" and/or "B" slurries at a sufficient rate to maintain a substantially constant concentration. The slurries containing the intumescent materials were under continuous agitation using a 3-bladed propeller rotating at sufficient speed to keep the intumescent material suspended within the slurry. The slurries and particles were metered at variable rates and directed to either the top or bottom layer headboxes to make multi-layer sheets having the desired dry weight compositions and thicknesses. The slurry contained in the bottom layer headbox was kept under continuous agitation using a horizontal rotating mixing roll. Both headboxes were mounted on the inclined section of the wire as described above. The wire speed was maintained at about 2 feet/min (0.61 m/min) and the A and B slurries were pumped to the respective headboxes at a rate of about 5 gal/min (18.9 L/min) to achieve the desired layer basis weight and thickness. Sufficient vacuum was applied to the slurries to obtain formed and dewatered layers. The dewatered multilayer sheets were then wet pressed through rollers, dried using drying rollers, and then wound on a winding stand to form a continuous roll. The total sheet thickness, sheet and layer basis weights, and dry weight percentages of V and G in each layer of Examples 1–5 are shown in Table 3 below.

Example 6

Seventy-five pounds (34.1 kg.) of ceramic fibers (FIBERRAX™ 7000M) were slushed in 400 gallons (1514 L) of water in a Mordon Slush-Maker for 90 seconds then transferred to a 2000 gallon (7570 L) chest. Another 75 pounds (34.1 kg) of ceramic fibers (FIBERFRAX™ 7000M) were slushed as described above and added to the 2000 gallon (7570 L) chest and the combined batches were diluted with 250 gallons (946 L) of rinse water. Twenty-two pounds (10 kg.) of latex (AIRFLEX™ 600BP, 55 percent solids), 3.3 pounds (1.5 kg.) liquid sodium aluminate (NALCO™ 2372, from Nalco Chemical, Naperville, Ill.), and 3.1 ounces (0.09 liters) of defoamer (FOAMASTER™III, from Henkel Co., Edison, N.J.) were then added to the chest while mixing. After 2 to 3 minutes, the pH of the mixture was measured at 5.6. Then, 23 pounds (10.4 kg) of aluminum sulfate (50 percent solids) was diluted with and equivalent volume of water and slowly added to the chest while mixing to form a slurry. This slurry is hereafter referred to as formula "C".

Two-hundred gallons (757 L) of formula "C" slurry was then pumped into a 1500 gallon (5678 L) chest and diluted with an additional 200 gallons (757 L) of water. Fifty gallons (189 L) of this slurry was drained from the chest. The resultant slurry is hereafter referred to as formula "D." Fifty pounds (22.7 kg) of expandable graphite (G) (GRAFOIL™ Grade 338-50 expandable graphite flake) was added to the formula "D" slurry while mixing. At this time, 3.4 ounces (0.1 L) of red dye (GRAPHTOL™ Red pigment dispersion, from Sandoz Colors and Chemicals East Hanover, N.J.) was added to the formula "C" slurry in the 2000 gallon (7570 L) chest containing base stock. Continuous mixing in addition to recirculation of the slurries by pumping from a bottom outlet through a 2 inch (5.1 centimeter) hose was maintained at a rate sufficient to keep all solids suspended in both chests.

Formula "C" slurry was then metered and delivered to a mix tank of 50 gallon (189 L) capacity at a rate sufficient to maintain the desired base web basis weight. Unexpanded vermiculite (V) was added to the mixing tank at a rate sufficient to maintain the desired proportion of vermiculite in the bottom layer of the sheet. These proportions were obtained by first measuring the basis weight of the layer formed without vermiculite and then adjusting the formula "C" slurry flow to the mix tank before metering unexpanded vermiculite into the mix tank, and then adjusting the rate of addition of the unexpanded vermiculite to obtain the desired basis weight of the resulting bottom layer.

The formula "C"+V slurry from the mix tank was fed by gravity to the first headbox mounted on the inclined wire section of the above described fourdrinier machine to form a 12 inch (30.5 cm) wide layer at a wire speed of 26.4 inches (67.1 cm) per minute. The formula "D"+G slurry was delivered to the second headbox mounted on the flat wire section of the fourdrinier machine. Sufficient vacuum was maintained through the lower layer at the point where the formula "D"+G slurry was delivered so to partially dewater the slurry to form a non-moldable flexible layer having about 70 percent expandable graphite by weight. Example 6 is described in Table 3 below.

TABLE 3

| EXAMPLE | LAYER | FORMULA[1] | BASIS WEIGHT[2] (g/m²) | THICKNESS[3] (mm) |
|---|---|---|---|---|
| 1 | Top | B +10% V | 752 | |
|   | Bottom | A | 1152 | |
|   |   |   | (1904) | (7.0) |
| 2 | Top | B + 10% V | 752 | |
|   | Bottom | A + 54% V | 2477 | |
|   |   |   | (3229) | (7.3) |
| 3 | Top | A | 1108 | |
|   | Bottom | A + 54% V | 2477 | |
|   |   |   | (3229) | (7.6) |
| 4 | Top | A + 61% G | 900 | |
|   | Bottom | A + 54% V | 2477 | |
|   |   |   | (3377) | (5.3) |
| 5 | Top | A + 61% G | 1290 | |
|   | Bottom | A + 54% V | 2477 | |
|   |   |   | (3767) | (6.7) |
| 6 | Top | D + 70% G | 560 | |
|   | Bottom | C + 37% V | 2390 | |
|   |   |   | (2950) | (6.1) |

[1] V = unexpanded vermiculite;
G = expandable graphite;
(%) = percent by dry weight in the layer.
[2] The total basis weight of both layers is shown in parentheses.
[3] The total thickness of both layers is shown in parentheses.

All of the above multilayer sheets were flexible and resilient and the layers were bonded together such that the layers could not be cleanly separated at the boundary between the layers. Each of the multilayer sheet examples could be handled without breaking or undesirable cracking. The above examples also demonstrate that such flexible and resilient multilayer sheets may be made using a continuous process that is less expensive and more efficient when compared with a process wherein multiple layers are bonded together using an adhesive or other auxiliary bonding means.

Example 7

Example 6 described above and Comparative Example 1, described below, were tested and compared for holding strength under the Real Condition Fixture Test (RCFT) described above. The temperatures used in the RCFT are representative of those found in a diesel catalytic converter. Comparative Example 1 (C1) was a 4070 gram per square meter (nominal) single layer, low temperature intumescent ceramic fiber sheet containing unexpanded vermiculite, commercially available under the trademark "INTERAM" TYPE 200 from Minnesota Mining and Manufacturing Company, St. Paul, Minn. The starting mount densities for Example 6 and C1 were 0.9 and 1.0 grams per cubic centimeter respectively.

The results of the RCFT for Example 6 and C1 are shown in Table 4 below. The results of the test show that the multilayer sheet of the invention provides higher pressures or holding force over the temperature range than the sheet of Comparative Example 1.

TABLE 4

| Monolith Temperature (C.) | Shell Temperature (C.) | Gap Change (cm) | Example 6 Pressure (kPa) | Comparative 1 (C1) Pressure (kPa) |
| --- | --- | --- | --- | --- |
| 25 | 25 | 0.0000 | 291.5 | 215.6 |
| 63 | 30 | 0.0001 | 231.2 | 162.1 |
| 100 | 35 | 0.0003 | 228.0 | 160.9 |
| 150 | 40 | 0.0003 | 223.1 | 152.5 |
| 200 | 55 | 0.0012 | 155.8 | 94.3 |
| 200 | 120 | 0.0068 | 101.1 | 57.8 |
| 200 (soak) | 120 | 0.0068 | 117.2 | 47.8 |
| 150 | 90 | 0.0046 | 115.5 | 49.9 |
| 100 | 60 | 0.0024 | 130.1 | 57.9 |
| 63 | 42 | 0.0012 | 140.4 | 65.4 |
| 25 | 25 | 0.0000 | 146.2 | 76.1 |

Example 8

A multilayer sheet containing a mixture of unexpanded vermiculite and expandable graphite in the top layer and unexpanded vermiculite in the bottom layer was made as described above for Examples 1–5. Example 8 is described below in Table 5.

TABLE 5

| EXAMPLE | LAYER | FORMULA[1] | BASIS WEIGHT[2] (g/m$^2$) | THICKNESS[3] (mm) |
| --- | --- | --- | --- | --- |
| 8 | Top | A + 33% V + 22% G | 526 | |
| | Bottom | A + 55% V | 2733 (3259) | (5.3) |

[1]V = unexpanded vermiculite;
G = expandable graphite;
(%) = percent by dry weight in the layer.
[2]The total basis weight of both layers is shown in parentheses.
[3]The total thickness of both layers is shown in parentheses.

The multilayer intumescent sheet of Example 8 was flexible and could be handled without breaking or undesirable cracking. The multilayer sheet of Example 8 also could not be cleanly separated at the boundary between the layers.

Example 9

Example 8 described above and Comparative Example 2, described below, were tested and compared for holding strength under a RCFT using the temperature profile described above for an automotive catalytic converter. Comparative Example (C2) was a 3100 gram per square meter (nominal) single layer, intumescent ceramic fiber sheet containing unexpanded treated vermiculite and is commercially available under the trademark "INTERAM" TYPE 100 from Minnesota Mining and Manufacturing Company, St. Paul, Minn. The starting mount density for Example 8 and C2 was 1.0 grams per cubic centimeter.

The results of the RCFT for Example 8 and C2 are shown in Table 6 below. The results of the test show that the intumescent multilayer sheet of Example 8 provides higher pressures or holding force over the temperature range and provides a lower pressure drop at low temperatures (25–400° C.) than the intumescent sheet of Comparative Example 2.

TABLE 6

| Monolith Temperature (C.) | Shell Temperature (C.) | Gap Change (cm) | Example 8 Pressure (kPa) | Comparative 2 (C2) Pressure (kPa) |
| --- | --- | --- | --- | --- |
| 25 | 25 | 0.0003 | 310 | 183 |
| 100 | 25 | 0.0003 | 259 | 101 |
| 150 | 30 | 0.0003 | 251 | 93 |
| 200 | 35 | 0.0003 | 226 | 80 |
| 250 | 38 | 0.0003 | 220 | 70 |
| 300 | 40 | 0.0003 | 246 | 65 |
| 350 | 45 | 0.0003 | 330 | 80 |
| 400 | 50 | 0.0003 | 434 | 123 |
| 450 | 60 | 0.0003 | 370 | 142 |
| 500 | 70 | 0.0003 | 380 | 184 |
| 550 | 85 | 0.0013 | 393 | 227 |
| 600 | 100 | 0.0025 | 448 | 282 |
| 650 | 125 | 0.0038 | 540 | 357 |
| 700 | 150 | 0.0051 | 640 | 442 |
| 750 | 185 | 0.0076 | 713 | 526 |
| 800 | 220 | 0.0102 | 787 | 626 |
| 850 | 325 | 0.0165 | 1021 | 853 |
| 900 | 430 | 0.0229 | 1251 | 1022 |
| 900 | 480 | 0.0267 | 1184 | 983 |
| 900 | 530 | 0.0305 | 1152 | 959 |
| 900 (soak) | 530 | 0.0305 | 944 | 869 |
| 850 | 502 | 0.0292 | 914 | 804 |
| 800 | 474 | 0.0279 | 869 | 800 |
| 750 | 445 | 0.0254 | 903 | 829 |
| 700 | 416 | 0.0229 | 940 | 904 |
| 650 | 387 | 0.0216 | 889 | 808 |
| 600 | 358 | 0.0203 | 830 | 770 |
| 550 | 329 | 0.0191 | 788 | 737 |
| 500 | 300 | 0.0178 | 682 | 635 |
| 450 | 275 | 0.0165 | 640 | 619 |
| 400 | 250 | 0.0152 | 529 | 475 |
| 350 | 215 | 0.0127 | 418 | 432 |
| 300 | 180 | 0.0102 | 289 | 306 |
| 250 | 155 | 0.0089 | 162 | 173 |
| 200 | 130 | 0.0076 | 76 | 96 |
| 150 | 95 | 0.0051 | 56 | 83 |
| 100 | 60 | 0.0025 | 68 | 83 |
| 50 | 50 | 0.0003 | 88 | 108 |

The holding pressure has a first cycle minimum (at heating/time interval "f") which can be numerically characterized as a percentage increase of the initial holding force:

(183−65)/183=64%

The holding pressure has a substantial increasing portion from heating/time interval "f" to heating/time interval "r", associated with the first heating of the unexpanded vermiculite material to a temperature above its intumescing temperature $T_{int}$ of about 300 to 340° C. The holding pressure has a first cycle maximum (at heating/time interval "r") which can be numerically characterized as a percentage increase of the initial holding force:

(1022−183)/183=458%

This first cycle maximum reflects that full expansion of the intumescent material during the first cycle is substantially complete at heating/time interval "r", when the housing is at 430° C. The holding pressure drops (i.e., has a first cycle loss) to a post-cycle ambient hold force 80. The first cycle loss is approximately 41%. The first cycle loss is due to the ongoing effects of the high compression/heating history of the mat material.

Figure 5:
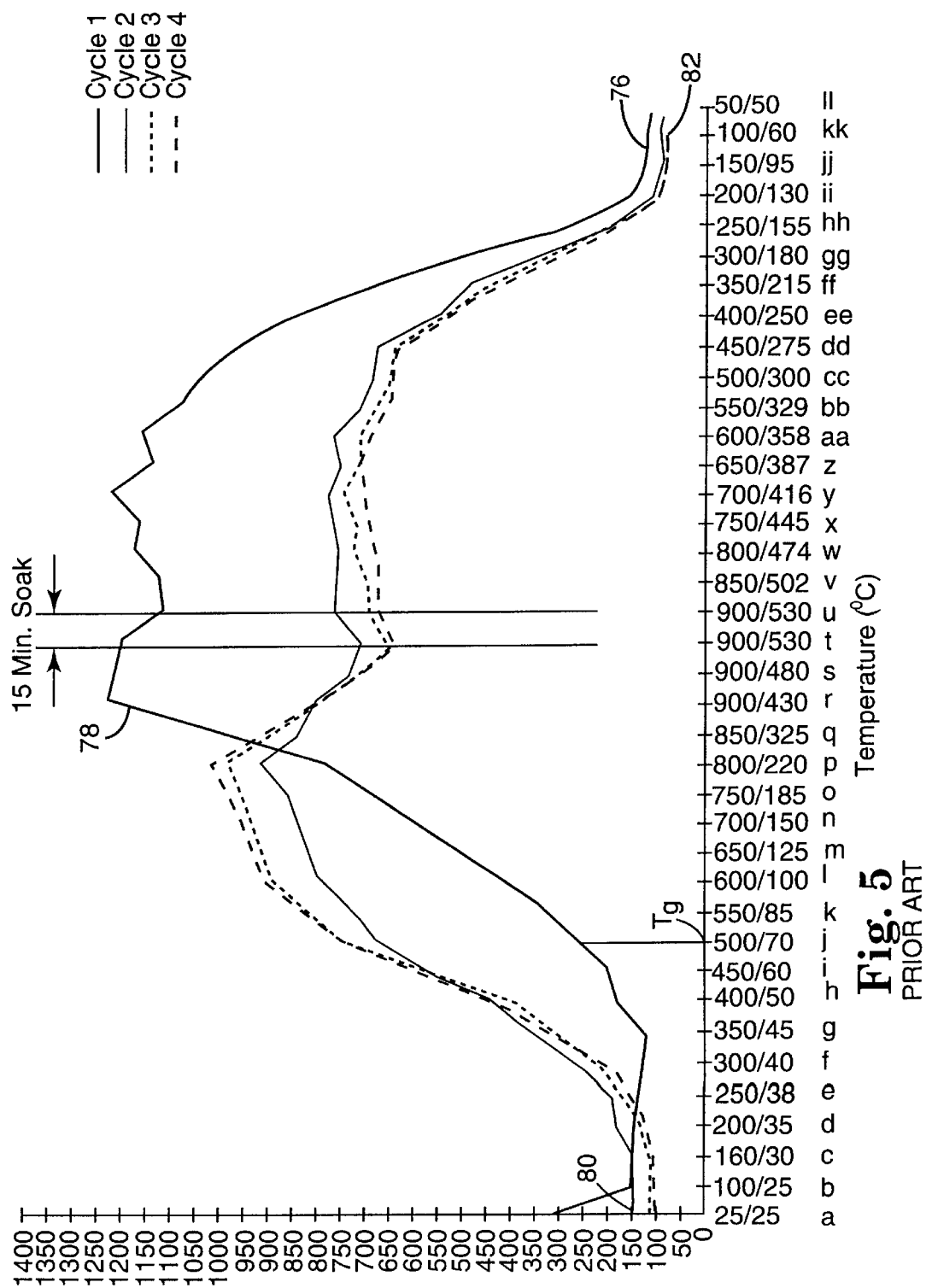
FIG. 5 is real condition fixture test results of a prior art intumescent mounting mat.
Figure 6:
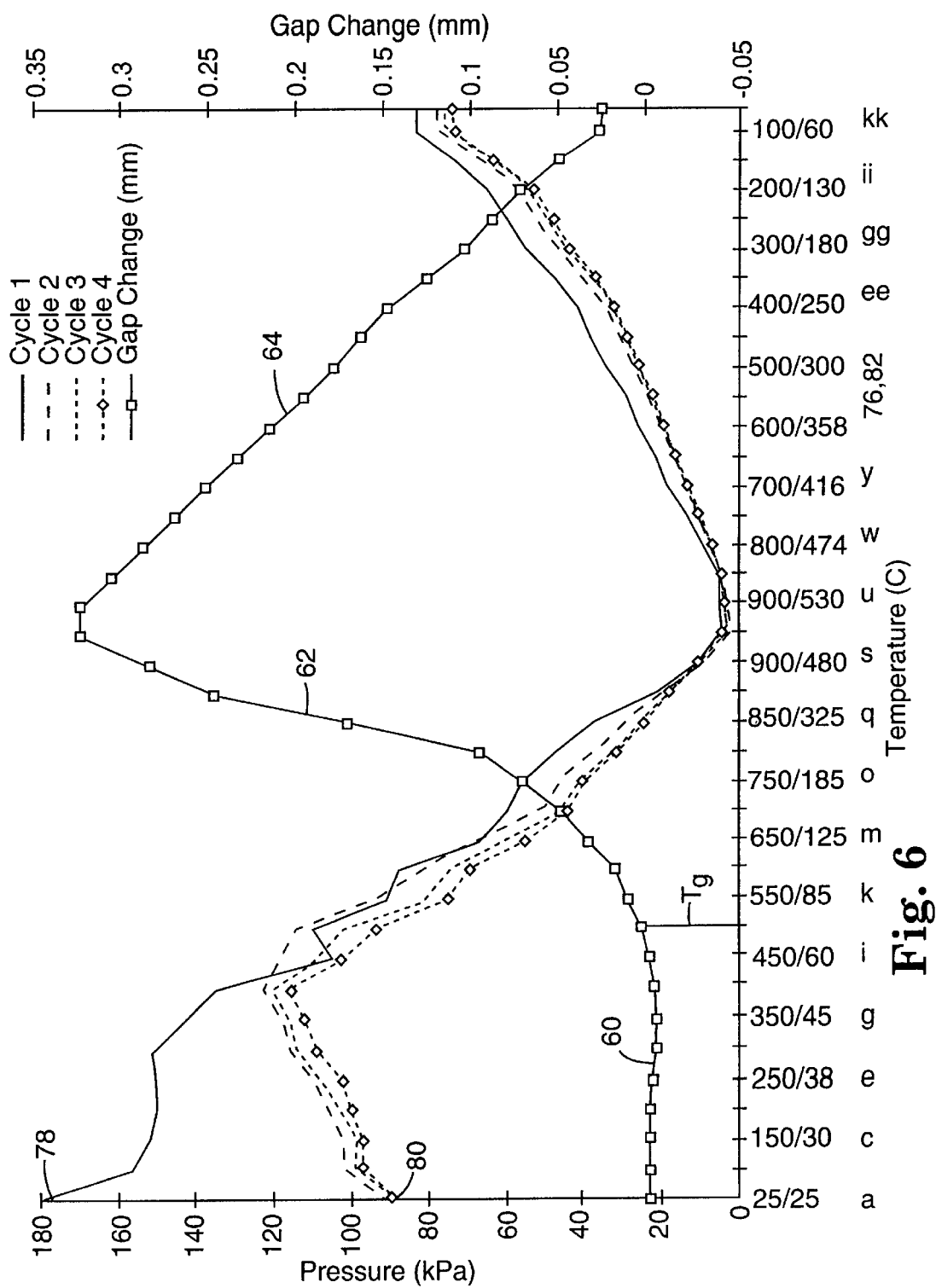
FIG. 6 is real condition fixture test results of the mounting mat of Example 10.
Figure 7:
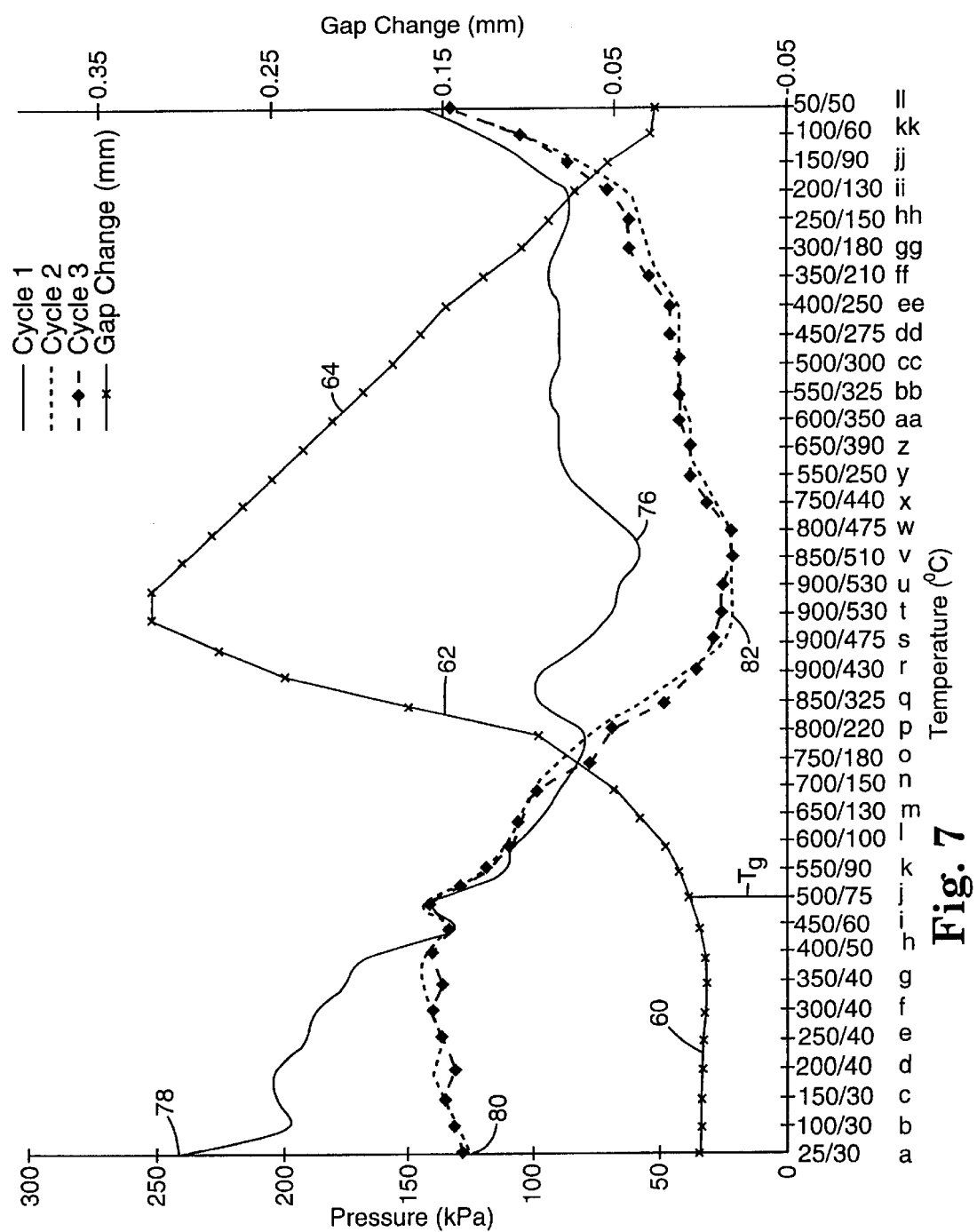
FIG. 7 is real condition fixture test results of the mounting mat of Example 11.
Figure 8:
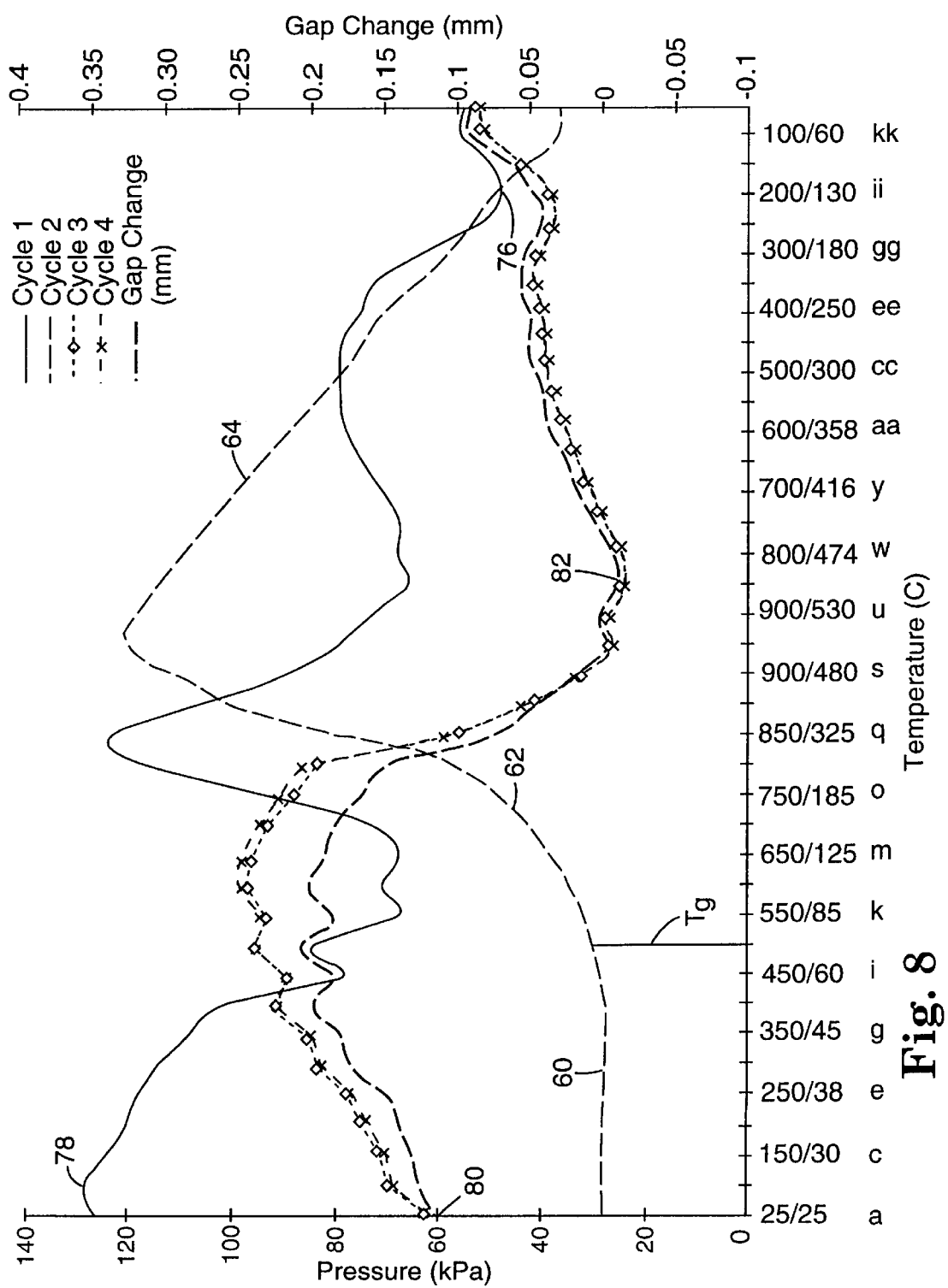
FIG. 8 is real condition fixture test results of the mounting mat of Example 12.
Figure 9:
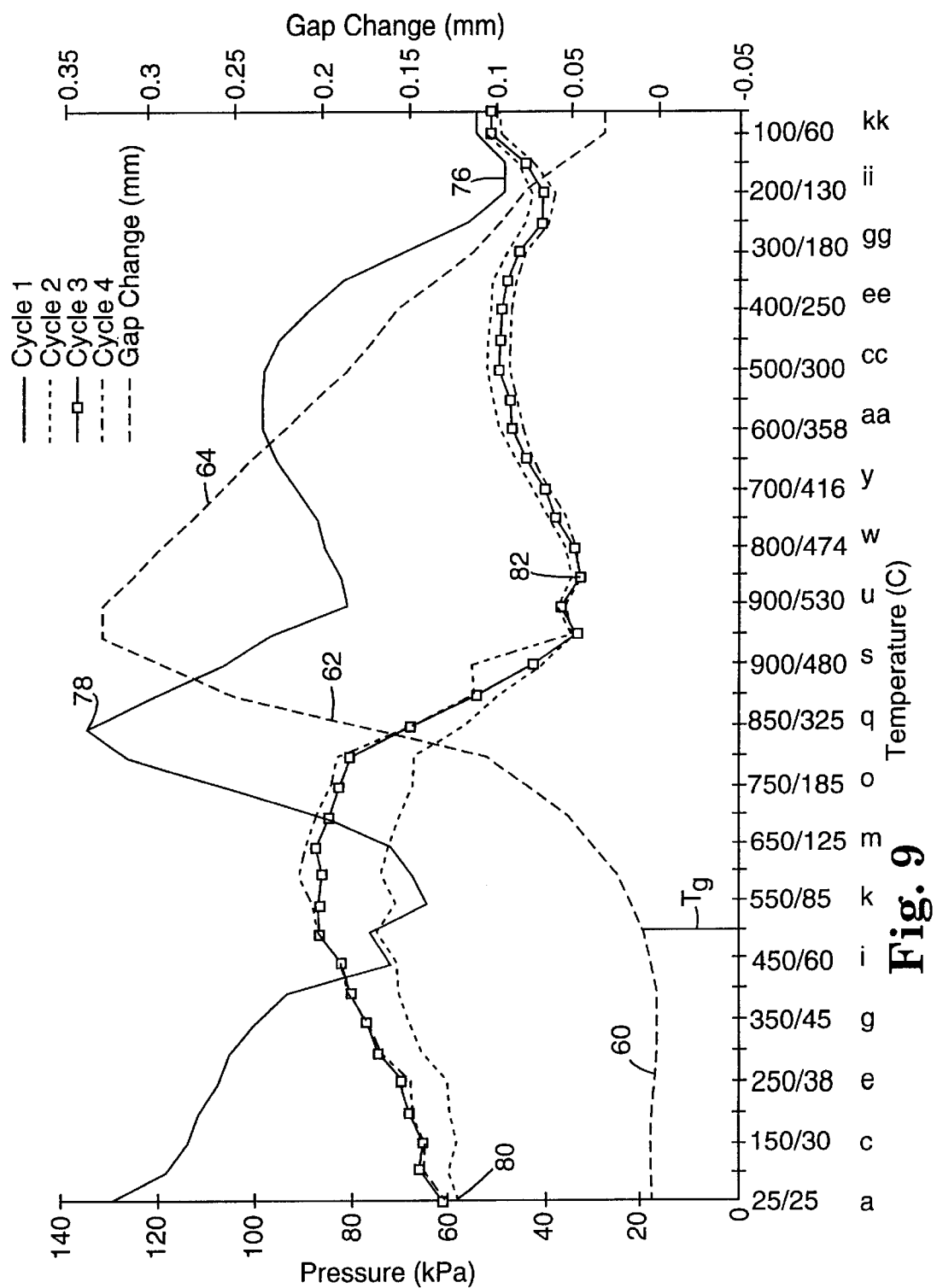
FIG. 9 is real condition fixture test results of the mounting mat of Example 13.
Figure 10:
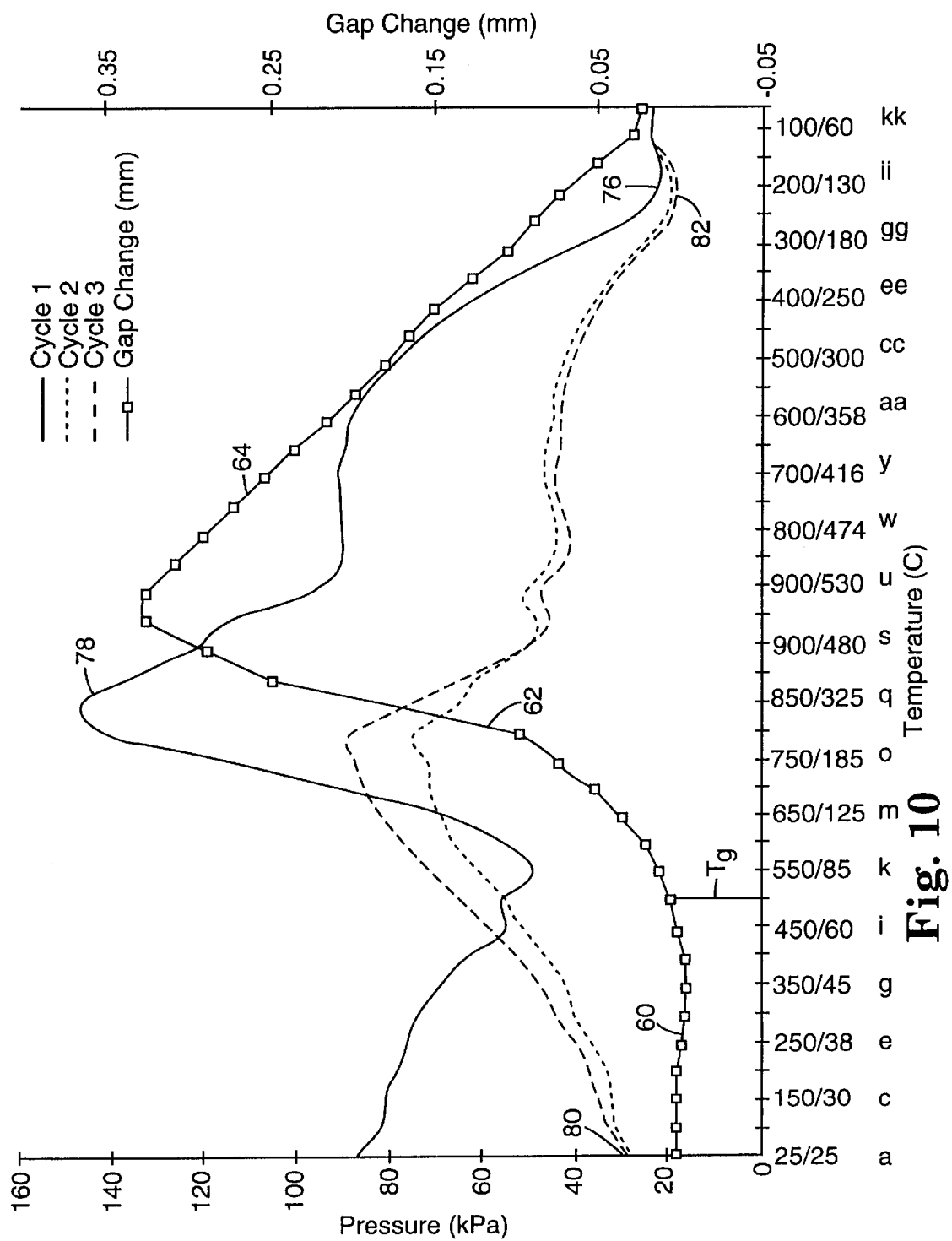
FIG. 10 is real condition fixture test results of the mounting mat of Example 14.

Additional RCFT results of Comparative Example 2 are further shown in FIG. 5. This RCFT was run on a second, different "INTERAM" TYPE 100 mat from Minnesota Mining and Manufacturing Company, St. Paul, Minn., and due to slight differences in mount density provide slightly higher mount pressures (i.e., about 300 kPa rather than 183 kPa) than those given in Table 6. The first cycle minimum 76 is about 60%, the first cycle maximum 78 is about 305%, and the first cycle loss can be numerically characterized as a percentage decrease of the initial holding force:

(300−146)/300=51%

FIG. 5 also shows subsequent thermal/compression cycles of the CE2 mounting mat. The holding pressure has a subsequent cycle minimum 82 which can be numerically characterized as a percentage decrease of the initial holding force:

(300−90)/300=70%

The subsequent cycle minimum point 82 can also be used to determine a second cycle loss, numerically characterized as a percentage decrease of the post-cycle ambient hold force 80:

(145−90)/145=38%

The ideal mounting mat would reduce each of the first cycle minimum 76, the first cycle maximum 78, the first cycle loss, the subsequent cycle minimum 82 and the second cycle loss to as close to zero percent (i.e., as close to constant pressure) as possible.

Examples 10–16

Fourteen pounds (6.3 kg) of 50% silica, 50% alumina bulk containing about 50% fibers, 50% shot (KAOWOOL® HA Bulk, available from Thermal Ceramics, Augusta, Ga.) and 4.2 pounds (1.9 kg) of 96% alumina fibers containing substantially no shot (SAFFIL® LDM, available from ICI Chemicals and Polymers, Widnes Chesire, UK) were slushed in 400 gallons (1514 L) of water in a Mordon Slush-Maker for 65 seconds. The fiber slush was transferred to a 1500 gallon (5679 L) chest and diluted with an additional 300 gallons (1136 L) of rinse water. Six pounds (2.7 kg) of acrylic ethyl vinyl acetate latex binder (55% solids AIRFLEX® 600 BP, available from Air Products, Allentown, Pa.) was added while mixing. Six pounds (2.7 kg) of aqueous aluminum sulfate solution known as papermaker's alum (50 percent solids) was then added to coagulate the latex. Two-thirds ounces (20 ml) of a defoaming agent (FOAMASTER® III, available from Henkel Corp., Edison N.J.) and seven pounds (3.2 kg) of a 0.1% liquid polyacrylamide flocculant (NALCO® 7530, available from Nalco Chemical Co. of Naperville, Ill.) were also added. This latex-fiber slurry is hereafter referred to as formula "E".

The formula "E" slurry was separated into two separate portions, with about 80% of the slurry in one portion and about 20% of the slurry in the second portion. An amount of unexpanded vermiculite having a mesh size of between 18 and 50 mesh (available from Cometals, Inc.) was metered and mixed into the 20% portion of the "E" slurry at a rate to maintain a substantially constant concentration. The "E" slurry containing the intumescent material was under continuous agitation to keep the intumescent material suspended within the slurry.

The 80% portion of the "E" slurry was directed to the bottom layer headbox, and the 20% portion of the "E" slurry containing the intumescent particles was directed to the top layer headbox to make multi-layer sheets having the desired dry weight compositions. The wire speed was maintained at about 1.7 feet/min (0.52 m/min) and the slurry portions were pumped to the respective headboxes at a total rate of about 16 gal/min (61 L/min) to achieve the desired layer basis weight and thickness. Sufficient vacuum was applied to the slurries to obtain formed and dewatered layers. The dewatered multilayer sheets were then wet pressed through rollers, dried using drying rollers, and then wound on a winding stand to form a continuous roll. The dry weight percentages of intumescent particles in each layer and overall, layer and total sheet thickness, and layer and sheet basis weights of Examples 10–14 are shown in Table 7 below.

TABLE 7

| EXAMPLE | LAYER | INTUMESCENT PARTICLE CONTENT | BASIS WEIGHT (g/m$^2$) | THICKNESS (mm) |
|---|---|---|---|---|
| 10 | Top | 0% | 265 | 1.4 |
|  | Bottom | 0% | 1100 | 5.8 |
|  | Overall | 0% | 1365 | 7.2 |
| 11 | Top | 31% | 384 | 1.3 |
|  | Bottom | 0% | 1100 | 5.6 |
|  | Overall | 8% | 1365 | 6.9 |
| 12 | Top | 45% | 480 | 1.1 |
|  | Bottom | 0% | 1100 | 5.5 |
|  | Overall | 13.6% | 1580 | 6.6 |
| 13 | Top | 50% | 525 | 0.9 |
|  | Bottom | 0% | 1100 | 5.4 |
|  | Overall | 16% | 1625 | 6.3 |
| 14 | Top | 63% | 720 | 1.1 |
|  | Bottom | 0% | 1100 | 5.2 |
|  | Overall | 25% | 1820 | 6.3 |

The RCFT results of Examples 10–14 are shown in FIGS. 6–10. For each of these samples, the RCFT was run for multiple thermal/compression cycles. The test results for subsequent cycles are strikingly different than the test results for each first cycle. While the gap change occurs substantially equally regardless of previous thermal/compression cycling, the pressure force exerted by the mat changes significantly. That is, the previous thermal and compression history of each mat significantly affects the amount of holding pressure in subsequent heating cycles.

Several interrelated effects are believed to contribute to the significant change produced by prior thermal and compression history of each mat. The amount of intumescent expansion is significantly different for unexpanded vermiculite versus previously expanded vermiculite. While unexpanded vermiculite undergoes significant expansion the first time it is heated to its intumescent temperature $T_{int}$, the intumescent expansion properties are significantly reduced for subsequent thermal cycling. High compression forces are believed to have a significant affect on the fiber matrix within the mat. High compression forces within the mat, particularly when combined with high temperature, can cause microscopic fiber damage, shrinkage and/or compression setting which causes the fiber matrix to be less resilient and assert less mounting force subsequent to the high mounting pressure/temperature. Compression and high temperature cycling effects on the fiber matrix can also change the erosion resistance properties of the mat and thermal conductivity of the mat.

The first cycle minimum 76, the first cycle maximum 78, the first cycle loss, the subsequent cycle minimum 82 and the second cycle loss for each of Examples 10–14 as compared to Comparative Example 2 are reported below in Table 8.

TABLE 8

| EXAMPLE | FIRST CYCLE MINIMUM | FIRST CYCLE MAXIMUM | FIRST CYCLE LOSS | SUBSEQUENT CYCLE MINIMUM | SECOND CYCLE LOSS |
|---|---|---|---|---|---|
| CE-2 (FIG. 5) | 60% | 305% | 52% | 70% | 38% |
| 10 (FIG. 6) | 98% | 0% | 50% | 99% | 99% |
| 11 (FIG. 7) | 67% | 0% | 48% | 91% | 84% |
| 12 (FIG. 8) | 62% | 2% | 52% | 81% | 63% |
| 13 (FIG. 9) | 63% | 2% | 54% | 75% | 45% |
| 14 (FIG. 10) | 87% | 69% | 68% | 78% | 32% |

The ideal mounting mat would reduce each of the first cycle minimum 76, the first cycle maximum 78, the first cycle loss, the subsequent cycle minimum 82 and the second cycle loss to as close to zero percent (i.e., at as constant a mounting pressure) as possible. As contrasted to Comparative Example 2 which also includes an intumescent material, the present invention desirably reduces the first cycle maximum 78 to a value less than about 100%, more desirably to a value less than about 50%, and even more desirably to a value less than about 10%. As contrasted to Example 10 which contains the same fiber mix but without the intumescent layer, the present invention desirably reduces the first cycle minimum 76 to a value less than about 90%, and even more desirably to a value less than about 75%. As contrasted to Example 10, the present invention desirably reduces the subsequent cycle minimum 82 to a value less than about 95%, more desirably to a value of about 90% or less, and more desirably to a value of about 75% or less. Also as contrasted to Example 10, the present invention desirably reduces the second cycle loss to a value less than about 95%, more desirably to a value less than about 85%, and even more desirably to a value of about 45% or less. These excellent results are achieved with minimal material costs, including only a small amount of intumescent material and a small amount of shot-free, high alumina fiber.

Figure 11:
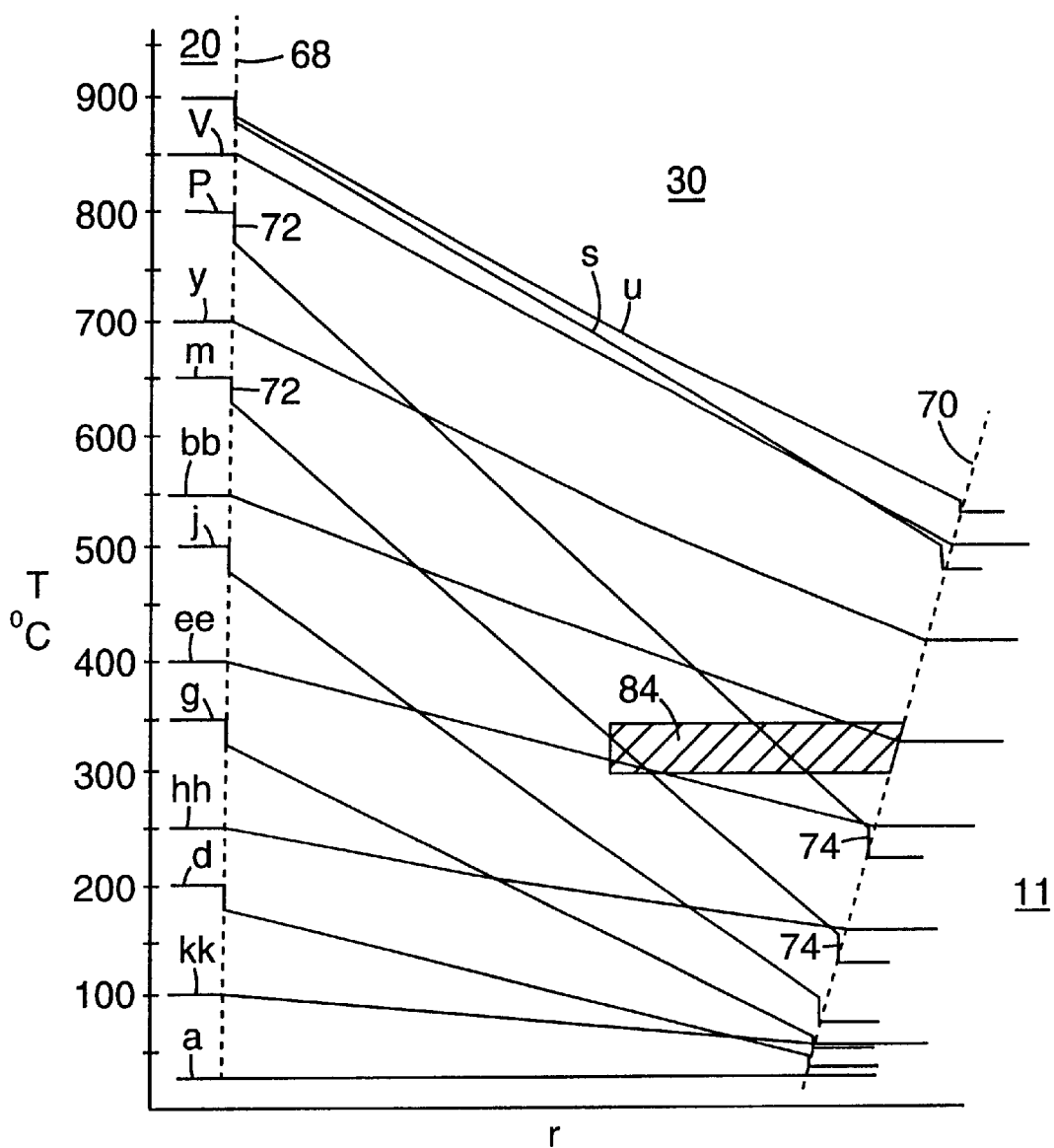
FIG. 11 is the temperature vs. radial location vs. time graph of FIG. 4 overlaid with an intumescent temperature range of Example 13.

The excellent results of the present invention can be further explained with reference to FIG. 11. FIG. 11 includes an "intumescent zone" 84 of Example 13 superimposed onto the temperature-radial location-time/heating interval graph of FIG. 3. The "intumescent zone" 84 is defined by the intumescing temperature of the intumescent material and by the radial location of the intumescent material in the mat 30. The intumescent material of Example 13 is unexpanded vermiculite, with an intumescing temperature $T_{int}$ of about 300 to 340° C. Other intumescent materials will have different intumescing temperatures, and may intumescent at a narrower or broader temperature range. The intumescent material of Example 13 is only located in the outer about 15–40% of the thickness of the mat 30 (after the mat 30 is compressed between the monolith 20 and the housing 11).

It is believed that the transmission of heat throughout the mat of the present invention remains fairly continuous. That is, because the mat is coformed, and perhaps also because the mat has the same inorganic fiber mix throughout the mat, heat is transmitted through the mat without setting up a thermal contact resistance (i.e., a point of temperature discontinuity) between the two layers of the mat. Accordingly, the assumption of linear temperature distributions through the mat remains fairly accurate.

The first temperature line to hit the intumescent zone 84 occurs after heating/time interval "j", at about heating/time interval "l". This coincides with the start of the high increase portion 62 of the gap. As the temperature lines move through the intumescent zone (i.e., until about heating/time interval "q") the intumescent material expands. The expansion of the intumescent material increases the mounting pressure during this important stage of the RCFT curve (FIG. 9), just when the gap is increasing most.

With the small proportion of intumescent material used and properly located within the mat, only limited expansion of the mat occurs, such that the first cycle maximum 78 is quite low. Resilience reduction of the fiber matrix due to high compression forces at high temperatures is minimized. Accordingly, subsequent cycles maintain maximum resiliency and holding force provided by the fiber matrix.

To obtain the most desired benefits of the present invention, the ratio between the outer layer thickness $t_o$ and inner layer thickness $t_i$ should be such that the temperature curve does not hit the intumescent zone 84 until the gap hits the high increase portion 62. With a gap that begins a high increase portion at a monolith temperature of 500° C. (475° C. over ambient), this can be mathematically stated as:

$$t_o \leq (t_o + t_i)(T_{int} - 25° C.)/475° C.$$

Recognizing that the transient effects of heat transfer, the radial nature of the system and any differences in thermal conductivity between the two layers will affect the linearity of the thermal gradients through the mounting mat, the edge of the intumescent zone 84 may be varied within about 10 to 20% while still substantially retaining the benefits of the present invention. The temperature of the monolith $T_g$ which starts the high gap increase portion 62 can also be different from 500° C. if the size of the gap or the thermal conductivity is significantly altered. That is:

$$0.8(t_o+t_i)(T_{int}-25° C.)/(T_g-25° C.) \leq t_o \leq 1.2(t_o+t_i)(T_{int}-25° C.)/(T_g-25° C.)$$

Figure 12:
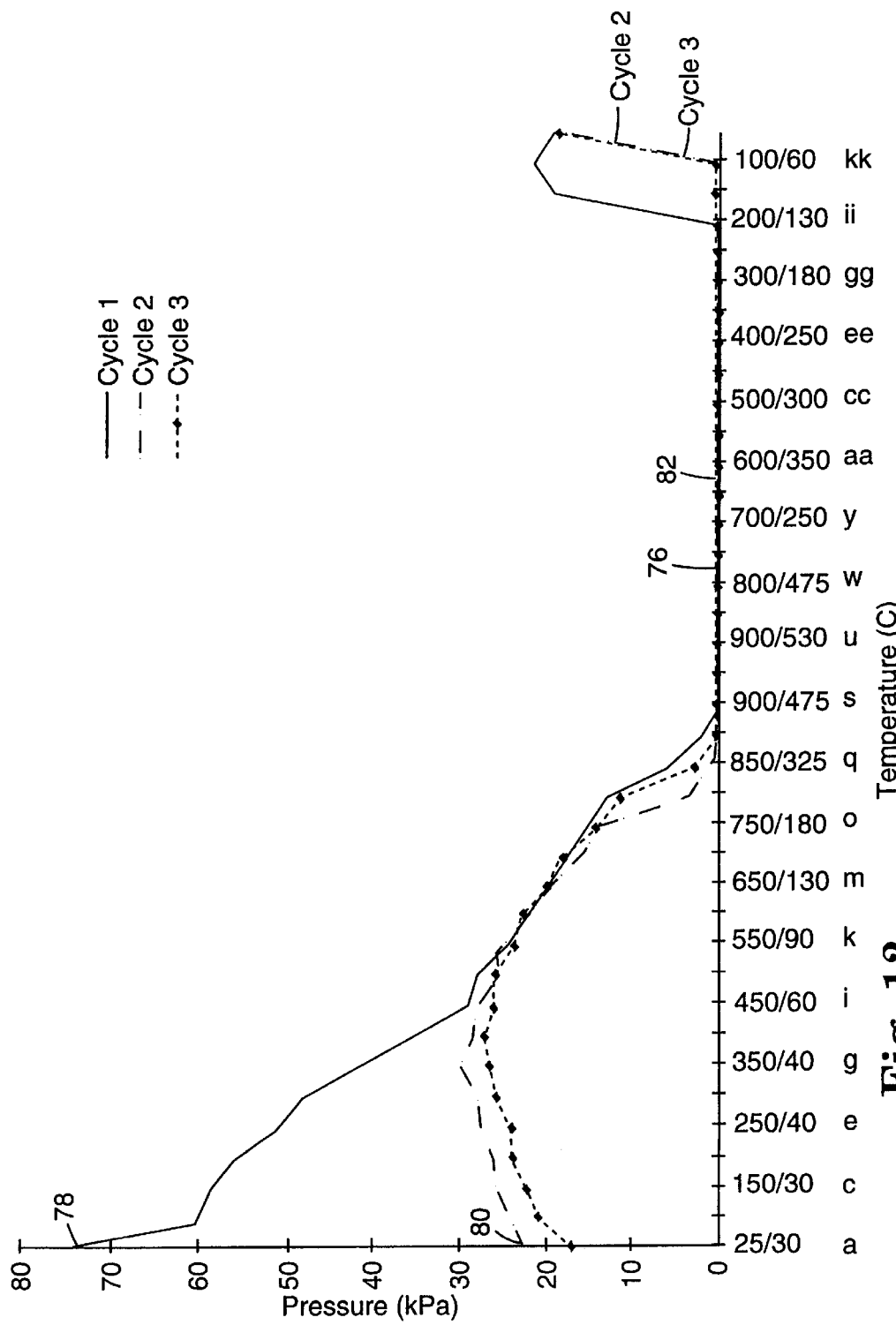
FIG. 12 is real condition fixture test results of an additional comparative example.

FIG. 12 shows a single cycle RCFT on a single layer non-intumescent mat similar to Example 10 but containing no shot-free high alumina inorganic fiber. Instead, all of the inorganic fiber material was provided by an about 50% alumina 50% silica bulk containing about 50% fibers and about 50% shot. As can be seen by comparison to Examples 10–14 shown in FIGS. 6–10, this mat provides poor results, including a first cycle minimum of 100%, a first cycle loss of 68%, a subsequent cycle minimum of 100% and a second cycle loss of 100%. The combination of shot-free inorganic fiber and inorganic fiber containing shot of each of Examples 10–14 provide much better results.

Cold erosion tests were run on Examples 10, 11 and on two additional examples 15 and 16. The parameters and results of the cold erosion test are given below in Table 9.

TABLE 9

| EXAMPLE | TOTAL INTUMESCENT CONTENT | MAT DENSITY (g/cc) | MOUNT DENSITY (g/cc) | EROSION RATE (g/hour) |
|---|---|---|---|---|
| 10 | 0% | .175 | 0.4 | 0.001 |
| 11 | 8% | .205 | 0.4 | 0.001 |
| 15 | 27% | .239 | 0.4 | 0.011 |
| 16 | 29% | .276 | 0.4 | 0.076 |

As shown by this data, the present invention provides excellent erosion rate results, such as less that about 0.1 g/hour, and more desirably about 0.01 g/hour or less, and most desirably about 0.001 g/hour or less, provided the vermiculite particle content in the outer layer is not too high. The erosion rate varies significantly based on the mount density, and higher mount densities can be used for high vermiculite content mats or mats with high vermiculite content layers.

Equivalents

It will be apparent to those skilled in the art that various modifications and variations can be made in the articles and method of the present invention without departing from the spirit or scope of the invention. For example, the thicknesses of each the various layers discussed herein are substantially constant throughout the layer. It is recognized that mats could be constructed within the present invention but not having an areally uniform construction, such as having side edges which are thicker or provide different thermal properties than the center of the mat. It should be understood that this invention is not intended to be unduly limited by the illustrative embodiments and examples set forth herein and that such examples and embodiments are presented by way of example only with the scope of the invention to be limited only by the claims set forth herein as follows.

What is claimed is:

1. A pollution control device comprising:
   a metal housing having a peripheral wall;
   a pollution control monolith disposed within the metal housing and defining a circumferential gap between the pollution control monolith and the peripheral wall; and
   a mounting mat disposed between the pollution control monolith and the peripheral wall within the circumferential gap for positioning the pollution control monolith and supporting the pollution control monolith with reduced mechanical and thermal shock, the mounting mat comprising:
   an inner layer of non-intumescent material toward the pollution control monolith, the inner layer comprising, by dry weight percent:
   from more than 0 to 50% shot-free inorganic fiber;
   from 40 to 98% inorganic fiber with shot; and binder;
   an outer layer toward the peripheral wall, the outer layer comprising, by dry weight percent:
   from 20 to 65% intumescent particles; and binder;
   wherein the mounting mat is compressed between the circumferential wall and the pollution control monolith to exert a mounting pressure on the pollution control monolith.

2. The pollution control device of claim 1, wherein the outer layer further comprises, by dry weight percent:
   from more than 0 to 40% of shot-free inorganic fiber; and
   from 10 to 78% of the inorganic fiber with shot.

3. The pollution control device of claim 2, wherein the shot-free inorganic fiber of the outer layer is of the same type as the shot-free inorganic fiber of the inner layer, and wherein the inorganic fiber with shot of the outer layer is of the same type as the inorganic fiber with shot of the inner layer.

4. The pollution control device of claim 2, wherein the relative proportions of shot-free inorganic fiber to inorganic fiber with shot are the same for the inner layer and the outer layer.

5. The pollution control device of claim 1, wherein the inner layer and the outer layers form a single sheet without the use of auxiliary bonding means.

6. The pollution control device of claim 1, wherein said pollution control device is a catalytic converter, and the inner layer has a thickness $t_i$, the intumescent particles have an initial intumescing temperature $T_{int}$, and the outer layer has a thickness $t_o$ which is within the formula:

$$t_o \leq (t_o + t_i)(T_{int} - 25° C.)/475° C.$$

7. The pollution control device of claim 1, wherein the inner layer has a thickness $t_i$, the intumescent particles have an initial intumescing temperature $T_{int}$, the pollution control device has a temperature of the monolith which causes substantial gap increase $T_g$, and the outer layer has a thickness $t_o$ which is within the formula:

$$0.8(t_o + t_i)(T_{int} - 25° C.)/(T_g - 25° C.) \leq t_o \leq 1.2(t_o + t_i)(T_{int} - 25° C.)/(T_g - 25° C.).$$

8. The pollution control device of claim 1, wherein the thickness of the inner layer plus the thickness of the outer layer is from greater than 100% to 400% of the circumferential gap.

9. The pollution control device of claim 1, wherein said mounting mat exhibits a first cycle maximum of less than about 100%.

10. The pollution control device of claim 1, wherein said mounting mat exhibits a second cycle minimum of less than about 90%.

11. The pollution control device of claim 1, wherein said mounting mat exhibits a maximum mounting pressure of less than about 500 kPa.

12. The pollution control device of claim 1, wherein said mounting mat exhibits a minimum mounting pressure of greater than about 15 kPa.

13. The pollution control device of claim 1 wherein the particles are unexpanded vermiculite.

14. The pollution control device of claim 1, wherein the inorganic fiber with shot is about 50% silica, 50% alumina fiber.

15. The pollution control device of claim 1, wherein the shot-free inorganic fiber is alumina fiber.

* * * * *